(12) United States Patent
Feng et al.

(10) Patent No.: US 11,808,402 B2
(45) Date of Patent: Nov. 7, 2023

(54) JOINT ASSEMBLY

(71) Applicant: Hand Held Products, Inc., Charlotte, NC (US)

(72) Inventors: Chen Feng, Mount Laurel, NJ (US); Paul Poloniewicz, Fort Mill, SC (US)

(73) Assignee: Hand Held Products, Inc., Charlotte, NC (US)

( * ) Notice: Subject to any disclaimer, the term of this patent is extended or adjusted under 35 U.S.C. 154(b) by 340 days.

(21) Appl. No.: 17/092,976

(22) Filed: Nov. 9, 2020

(65) Prior Publication Data

US 2022/0146040 A1 May 12, 2022

(51) Int. Cl.
*F16M 13/02* (2006.01)
*F16C 11/04* (2006.01)
*G03B 17/56* (2021.01)

(52) U.S. Cl.
CPC ........... *F16M 13/022* (2013.01); *F16C 11/04* (2013.01); *G03B 17/561* (2013.01); *F16M 2200/022* (2013.01)

(58) Field of Classification Search
CPC ...... F16M 13/022; F16M 11/04; F16M 11/08; F16C 11/04; G03B 17/561
USPC ........................................ 248/278.1; 403/345
See application file for complete search history.

(56) References Cited

U.S. PATENT DOCUMENTS

| | | | | |
|---|---|---|---|---|
| 4,249,817 | A * | 2/1981 | Blau | G03B 17/566 396/428 |
| 6,739,559 | B2 * | 5/2004 | Nakatani | F16M 11/24 396/419 |
| 7,828,256 | B2 * | 11/2010 | Speggiorin | F16M 11/041 396/419 |
| 8,002,227 | B2 * | 8/2011 | Garcia | F16M 11/126 248/278.1 |
| 9,989,836 | B1 * | 6/2018 | Riddel | F16M 13/00 |

OTHER PUBLICATIONS

European search report dated Mar. 14, 2022 for EP Application No. 21200821.

* cited by examiner

*Primary Examiner* — Todd M Epps
(74) *Attorney, Agent, or Firm* — Alston & Bird LLP

(57) ABSTRACT

The present disclosure provides a joint assembly for an apparatus comprising an object and a base component. The joint assembly comprises a first joint component coupled to a second joint component and each joint component comprises annular joint sections. A first peripheral section of a first annular joint section of the first joint component abut with a second peripheral section of a second annular joint section of the second joint component is defined to rotate about a first axis. A second peripheral section of a second annular joint section of the first joint component abut with the base component is defined to rotate about a second axis. A first peripheral section of a first annular joint section of the second joint component abut with the object is defined to rotate about the third axis. The first axis, the second axis, and third axis are orthogonal to each other.

19 Claims, 9 Drawing Sheets

JOINT ASSEMBLY

TECHNICAL FIELD

Example embodiments of the present disclosure relate generally to a joint assembly, more particularly, to structural configuration of the joint assembly.

BACKGROUND

Typically, a conventional ball joint mounting bracket may be used to mount an object such as a camera, a tablet, a mobile phone, a television set, etc., on a mounting frame or to a wall. The ball joint mounting bracket that is used for mounting and adjustment purposes suffers from drifting or slippage upon thermal and structural impact caused by external factors such as, temperature changes, vibrations, shock, etc.

BRIEF SUMMARY

Various embodiments described herein illustrate a joint component comprising a first annular joint section and a second annular joint section. The first annular joint section defines a first axis. A first peripheral section of the first annular joint section is defined to rotate about the first axis. The second annular joint section is fixedly coupled to the first annular joint section. The second annular joint section defines a second axis. A second peripheral section of the second annular joint section is defined to rotate about the second axis. The second axis may be orthogonal to the first axis.

Various embodiments described herein illustrate a joint assembly comprising a first joint component and a second joint component. The first joint component comprises a first annular joint section and a second annular joint section. The first annular joint section of the first joint component defines a first axis. A first peripheral section of the first annular joint section is defined to rotate about the first axis. The second annular joint section of the first joint component is fixedly coupled to the first annular joint section of the first joint component. The second annular joint section of the first joint component defines a second axis. A second peripheral section of the second annular joint section is defined to rotate about the second axis. The second axis may be orthogonal to the first axis. The second joint component is coupled to the first joint component. The second joint component comprises a first annular joint section and a second annular joint section. The first annular joint section of the second joint component defines a third axis. A first peripheral section of the first annular joint section of the second joint component is defined to rotate about the third axis. The third axis may be orthogonal to the first axis and the second axis. The second annular joint section of the second joint component is fixedly coupled to the first annular joint section of the second joint component. A second peripheral section of the second annular joint section is defined to rotate about the first axis.

Various embodiments described herein illustrate an apparatus comprising an object, a base component, and a joint assembly. The base component provides support to the object. The joint assembly is coupled to the object and the base component. The joint assembly comprises a first joint component and a second joint component. The first joint component comprises a first annular joint section and a second annular joint section. The first annular joint section of the first joint component defines a first axis. A first peripheral section of the first annular joint section is defined to rotate about the first axis. The second annular joint section of the first joint component is fixedly coupled to the first annular joint section of the first joint component. The second annular joint section of the first joint component defines a second axis. A second peripheral section of the second annular joint section is defined to rotate about the second axis. The second axis may be orthogonal to the first axis. The second joint component is coupled to the first joint component. The second joint component comprises a first annular joint section and a second annular joint section. The first annular joint section of the second joint component defines a third axis. A first peripheral section of the first annular joint section of the second joint component is defined to rotate about the third axis. The third axis may be orthogonal to the first axis and the second axis. The second annular joint section of the second joint component is fixedly coupled to the first annular joint section of the second joint component. A second peripheral section of the second annular joint section is defined to rotate about the first axis.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF THE INVENTION

Figure 1:
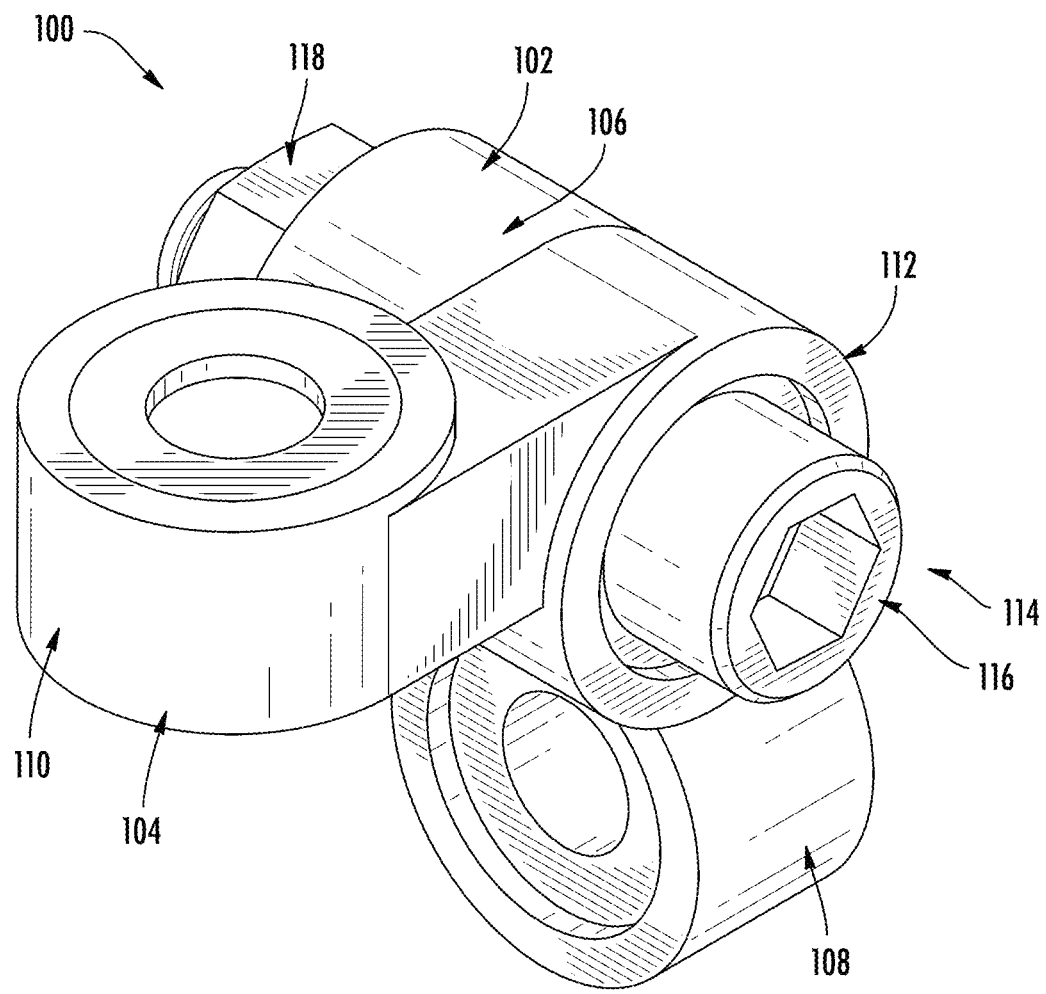
FIG. 1 exemplarily illustrates a perspective view of a joint assembly, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, one or more particular features, structures, or characteristics from one or more embodiments may be combined in any suitable manner in one or more other embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

Embodiments of the present invention recognize, an object may be mounted on a ball joint mounting bracket to provide 3 degrees of freedom (DOF) to rotational motion of the object. For example, the object may correspond to a camera device that may be mounted on the ball joint mounting bracket, comprising a ball and socket joint, to provide the 3 DOF to the rotational motion of the camera device. Further, over a typical course of usage of the camera device coupled to the ball joint mounting bracket, a position or an orientation of the camera device may get modified, as rubber material of the ball joint mounting bracket may lose retention capability due to temperature changes, vibrations, shock, etc. With extended use of the ball joint mounting bracket to adjust positions and/or orientations of the camera device, retention capability of the ball joint mounting bracket reduces over time which leads to imprecise positioning of the camera device. Due to the loss in the retention capability of the ball joint mounting bracket, the camera device may face frequent drifts or slippage leading to imprecise image capturing by the camera device.

The present disclosure provides a joint assembly. In an embodiment, the joint assembly may be coupled to an object, such as a camera device, and a base component. For the purpose of ongoing description, the object is considered to be the camera device. However, those having ordinary skill in the art would appreciate that any object can be coupled to the joint assembly, without departing from the scope of the disclosure. The joint assembly comprises a first joint component and a second joint component. In an example implementation, the structures of the first joint component and a second joint component correspond to two identical or different two-dimensional (2D) joint components that are coupled together to form a double 2D joint mounting mechanism. The first joint component comprises a first annular joint section and a second annular joint section. The first annular joint section of the first joint component defines a first peripheral section of the first annular joint section of the first joint component. The first annular joint section of the first joint component is defined to rotate about a first axis defined by the first annular joint section of the first joint component. The second annular joint section of the first joint component defines a second peripheral section of the second annular joint section of the first joint component. The second annular joint section of the first joint component is defined to rotate about a second axis defined by the second annular joint section of the first joint component. In an embodiment, the second axis may be orthogonal to the first axis. In an embodiment, the second annular joint section of the first joint component is fixedly coupled to the first annular joint section of the first joint component.

The second joint component is coupled to the first joint component. The second joint component comprises a first annular joint section and a second annular joint section. The first annular joint section of the second joint component defines a first peripheral section of the first annular joint section of the second joint component. The first peripheral section of the first annular joint section is defined to rotate about a third axis defined by the first annular joint section of the second joint component. In an embodiment, the third axis may be orthogonal to the first axis and the second axis. The second annular joint section of the second joint component defines a second peripheral section of the second annular joint section that is defined to rotate about the first axis. The second annular joint section of the second joint component is fixedly coupled to the first annular joint section of the second joint component.

Further, the joint assembly provides three degrees of freedom (DOF) to a rotational motion of the object, such as the camera device, with respect to the base component. For example, a first peripheral surface of the first annular joint section of the first joint component abuts with a second peripheral surface of the second annular joint section of the second joint component to be rotatable about the first axis. In an embodiment, the first axis corresponds to a Y-axis that allows "pitch" rotational motion of the camera device. A second peripheral surface of the second annular joint section of the first joint component abuts with the base component to be rotatable about the second axis. In an embodiment, the second axis corresponds to an X-axis that allows "roll" rotational motion of the camera device. A first peripheral surface of the first annular joint section of the second joint component abuts with the camera device to be rotatable about the third axis. In an embodiment, the third axis corresponds to a Z-axis that allows "yaw" rotational motion of the camera device. Separate X, Y, and Z-axes rotational motion of the camera device allow a user to efficiently adjust an orientation and/or a position of the camera device about any of the three axes, thereby providing the 3 DOF to the rotational motion of the camera device. For example, the joint assembly may provide improved precision and better mounting stability to help industrial camera deployment in bar code scanning and machine vision applications.

Therefore, the present disclosure provides the joint assembly in the form of a double 2D joint mounting mechanism that may consist of two identical or different 2D joint components (the first joint component and the second joint component) to replace a convention ball joint mounting bracket in conventional mounting assemblies. A flat metal-to-metal surface contact secured by the coupling of the first joint component with the second joint component ensures a long-term position stability of the object. During setup or installation of the object on the base component, low friction plastic-to-metal surface contact facilitates smooth movement while making adjustments to meet fine alignment requirements for installation and/or modifications in the orientation and/or the position of the object.

FIG. 1 exemplarily illustrates a perspective view of the joint assembly 100, according to one or more embodiments described herein. In an embodiment, the joint assembly 100 refers to a joint structural assembly that may be used to replace a conventional ball-head joint structure with a ball and socket type joint that is used for orientation and/or position control of an object, such as a camera device coupled to a tripod stand.

In an embodiment, the joint assembly 100 comprises a first joint component 102 and a second joint component 104. In an embodiment, the first joint component 102 comprises a first annular joint section 106 and a second annular joint section 108. In an embodiment, the second joint component 104 comprises a first annular joint section 110 and a second annular joint section 112. The structures of the first joint component 102 and the second joint component 104 are described further in conjunction with FIG. 2. In an embodiment, the first joint component 102 is coupled to the second joint component 104 by using a first fastener 114. The first fastener 114 may comprise a first screw 116 and a first nut 118 that are used to fasten the first annular joint section 106 of the first joint component 102 to the second annular joint section 112 of the second joint component 104, as exemplarily illustrated in FIG. 1.

Figure 2:
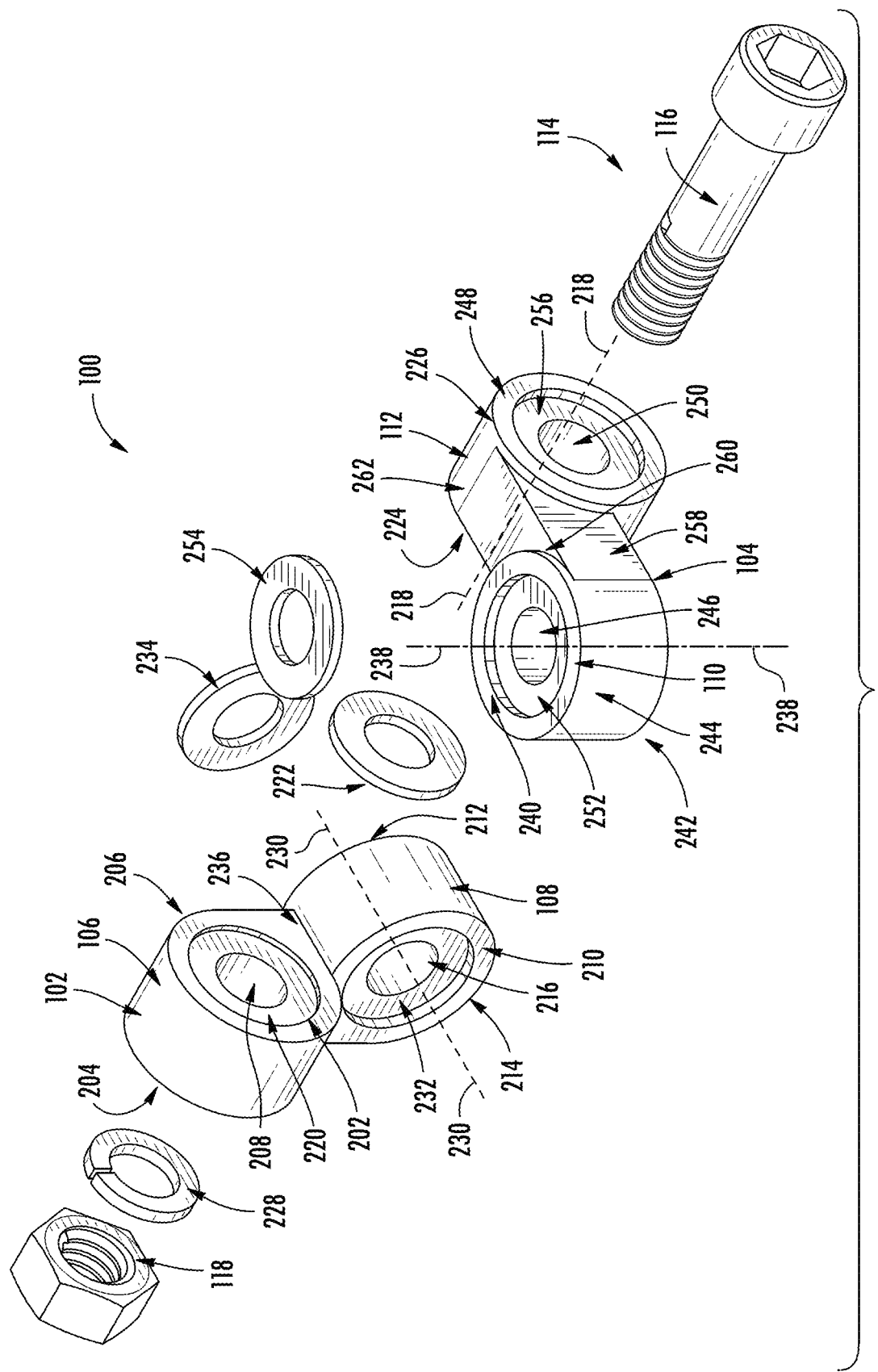
FIG. 2 exemplarily illustrates an exploded view of the joint assembly, according to one or more embodiments described herein.

FIG. 2 exemplarily illustrates an exploded view of the joint assembly 100, according to one or more embodiments described herein.

As exemplarily illustrated in FIG. 2, the joint assembly 100 comprises the first joint component 102 and the second joint component 104. In an embodiment, the second joint component 104 is coupled to the first joint component 102. The coupling of the second joint component 104 to the first joint component 102 will be further described in the description below.

In an embodiment, the first joint component 102 comprises the first annular joint section 106 and the second annular joint section 108. As used herein, the phrases "first annular joint section" and "second annular joint section" refer to annular sections of a joint component such that each annular section defines a respective through hole to allow passage and retention of a fastener such as, a screw in the respective through hole. For example, the first annular joint section 106 of the first joint component 102 defines a first through hole 208 to allow retention of a portion of the first fastener 114, which will be described further in the description below. In another example, the second annular joint section 108 of the first joint component 102 defines a second through hole 216 to allow passage and retention of a portion of the second fastener 742, which will be described further in the description below.

In an embodiment, the first annular joint section 106 of the first joint component 102 defines a first axis 218. In an example embodiment, the first axis 218 may correspond to an axis that may pass through the first through hole 208 of the first annular joint section 106 of the first joint component 102. In an embodiment, the first axis 218 is one of the three axes of the joint assembly 100 that provide three degrees of freedom to a rotational motion of an object 502 (exemplarily illustrated in FIG. 5) with respect to a base component 504 (exemplarily illustrated in FIG. 5). For example, the first axis 218 corresponds to a Y-axis that allows "pitch" rotational motion of the object 502 such as the camera device 602 with respect to the base component 504, as exemplarily illustrated and described further in conjunction with FIG. 8.

In an embodiment, the first annular joint section 106 of the first joint component 102 defines a first peripheral section 206, as exemplarily illustrated in FIG. 2. As used herein, the phrase "peripheral section" refers to a tubular section defined about an axis defined by the annular joint section. For example, the first peripheral section 206 refers to a tubular section defined about the first axis 218 defined by the first annular joint section 106 of the first joint component 102, as exemplarily illustrated in FIG. 2. In an embodiment, the first peripheral section 206, of the first annular joint section 106 of the first joint component 102, is defined to rotate about the first axis 218 corresponding to the Y-axis that allows the "pitch" rotational motion of the object 502 with respect to the base component 504. For example, the first peripheral section 206, of the first annular joint section 106 of the first joint component 102, may be rotatable about the first axis 218 corresponding to the Y-axis, thereby allowing the object 502 coupled to the joint assembly 100 to rotate in up or down directions (pitch) about the first axis 218.

In an embodiment, the first peripheral section 206 of the first annular joint section 106 of the first joint component 102 comprises a first peripheral surface 202 and a second peripheral surface 204. As used herein, the phrases "first peripheral surface" and "second peripheral surface" refer to planar surfaces of a peripheral section that are spaced apart along the first axis 218 defined by the first peripheral section 206 of the first annular joint section 106 of the first joint component 102.

In an embodiment, the first peripheral surface 202 and the second peripheral surface 204, of the first peripheral section 206 of the first annular joint section 106 of the first joint component 102 define the first through hole 208 to allow retention of a portion of the first fastener 114, as exemplarily illustrated in FIG. 2. The first through hole 208 extends from the first peripheral surface 202 to the second peripheral surface 204 of the first peripheral section 206 of the first annular joint section 106 of the first joint component 102. In another example, the first peripheral surface 210 and the second peripheral surface 212, of the second peripheral section 214 of the second annular joint section 108 of the first joint component 102 define the second through hole 216 to allow passage and retention of a portion of the second fastener 742 (exemplarily illustrated in FIG. 2). The second through hole 216 extends from the first peripheral surface 210 to the second peripheral surface 212 of the second peripheral section 214 of the second annular joint section 108 of the first joint component 102.

In an embodiment, the first peripheral surface 202, of the first peripheral section 206 of the first annular joint section 106 of the first joint component 102, defines a first recess 220 defining the first axis 218. As used herein, the term "recess" refers to a depression defined in a peripheral surface of an annular joint section that defines an axis of the annular joint section. For example, the first recess 220 refers to a first depression defined in the first peripheral surface 202, of the first peripheral section 206 of the first annular joint section 106 of the first joint component 102, that defines the first axis 218 of the first annular joint section 106 of the first joint component 102. In an example embodiment, the first recess 220 is inscribed in an inner peripheral surface of the first peripheral surface 202, of the first peripheral section 206 of the first annular joint section 106 of the first joint component 102, such that an outer peripheral surface of the first peripheral surface 202, of the first peripheral section 206 of the first annular joint section 106 of the first joint component 102, is elevated in comparison to the inner peripheral surface defining the first recess 220, as exemplarily illustrated in FIG. 2.

In an embodiment, the first recess 220, of the first peripheral surface 202 of the first peripheral section 206 of the first annular joint section 106 of the first joint component 102, receives a first washer 222. As used herein, the term "washer" refers to a washer made of elastic material that may deform when force is applied on the washer. For example, the first washer 222 is made of elastic material such as Teflon that may deform when force is applied on the first washer 222. The structure of the second peripheral surface 224, of the second peripheral section 226 of the second annular joint section 112 of the second joint component 104, is described below. In an example implementation, the material of the first washer 222 comprises any material with substantial elasticity to allow substantial friction between the first peripheral surface 202, of the first peripheral section 206 of the first annular joint section 106 of the first joint component 102, and the second peripheral surface 224 of the second peripheral section 226 of the second annular joint section 112 of the second joint component 104. For example, the material may be made of Polytetrafluoroethylene (PTFE) material such as Teflon.

In an embodiment, the second peripheral surface 204, of the first peripheral section 206 of the first annular joint section 106 of the first joint component 102, defines a second recess (not shown) defining the first axis 218. As described earlier, the second recess refers to a second depression defined in the second peripheral surface 204, of the first peripheral section 206 of the first annular joint section 106 of the first joint component 102, that defines the first axis 218 of the first annular joint section 106 of the first joint component 102. In an example embodiment, the second recess is inscribed in an inner peripheral surface of the second peripheral surface 204, of the first peripheral section 206 of the first annular joint section 106 of the first joint component 102, such that an outer peripheral surface of the second peripheral surface 204 is elevated in comparison to the inner peripheral surface of the second peripheral surface 204 defining the second recess.

In an example embodiment, the second recess, of the second peripheral surface 204 of the first peripheral section 206 of the first annular joint section 106 of the first joint component 102, receives a portion of the first screw 116 of the first fastener 114 that is engaged with the first nut 118 and a first washer 228 of the first fastener 114. The first nut 118 and the first washer 228 are used to fasten the first screw 116.

In an embodiment, the second annular joint section 108 of the first joint component 102 defines a second axis 230. In an example embodiment, the second axis 230 may correspond to an axis that may pass through the second through hole 216 of the second annular joint section 108 of the first joint component 102. In an embodiment, the second axis 230 is one of the three axes of the joint assembly 100 that provide the three DOF to the rotational motion of the object 502 (exemplarily illustrated in FIG. 5) with respect to the base component 504 (exemplarily illustrated in FIG. 5). For example, the second axis 230 corresponds to an X-axis that allows "roll" rotational motion of the object 502 such as the camera device 602 with respect to the base component 504, as exemplarily illustrated and described further in conjunction with FIG. 8. In an example embodiment, the second annular joint section 108 of the first joint component 102 is rotatable about the second axis 230 corresponding to the X-axis, thereby allowing the object 502 coupled to the joint assembly 100 to rotate (roll) about the second axis 230.

In an embodiment, the second annular joint section 108 of the first joint component 102 defines a second peripheral section 214, as exemplarily illustrated in FIG. 2. As described earlier, the phrase "peripheral section" refers to a tubular section defined about an axis defined by the annular joint section. For example, the second peripheral section 214 refers to a tubular section defined about the second axis 230 defined by the second annular joint section 108 of the first joint component 102, as exemplarily illustrated in FIG. 2. In an embodiment, the second peripheral section 214 of the second annular joint section 108 of the first joint component 102 is defined to rotate about the second axis 230. For example, the rotation of the second peripheral section 214 of the second annular joint section 108 of the first joint component 102 about the second axis 230 allows the "roll" rotational motion of the object 502 such as the camera device 602 with respect to the base component 504, as exemplarily illustrated and described further in conjunction with FIG. 8. In an embodiment, the second axis 230 is orthogonal to the first axis 218. For example, the second axis 230 corresponding to the X-axis is orthogonal to the first axis 218 corresponding to the Y-axis, as exemplarily illustrated in FIG. 2 and FIG. 8.

In an embodiment, the second peripheral section 214 of the second annular joint section 108 of the first joint component 102 comprises a first peripheral surface 210 and a second peripheral surface 224. As described earlier, the phrases "first peripheral surface" and "second peripheral surface" refer to planar surfaces of a peripheral section that are spaced apart along the second axis 230 defined by the second peripheral section 214 of the second annular joint section 108 of the first joint component 102.

In an embodiment, the first peripheral surface 210, of the second peripheral section 214 of the second annular joint section 108 of the first joint component 102, defines a first recess 232 defining the second axis 230. In an example embodiment, the first recess 232 refers to a first depression defined in the first peripheral surface 210, of the second peripheral section 214 of the second annular joint section 108 of the first joint component 102, that defines the second axis 230 of the second annular joint section 108 of the first joint component 102. In an example embodiment, the first recess 232 is inscribed in an inner peripheral surface of the first peripheral surface 210, of the second peripheral section 214 of the second annular joint section 108 of the first joint component 102, such that an outer peripheral surface of the first peripheral surface 210, of the second peripheral section 214 of the second annular joint section 108 of the first joint component 102, is elevated in comparison to the inner peripheral surface of the first peripheral surface 210 defining the first recess 232, as exemplarily illustrated in FIG. 2.

Figure 7:
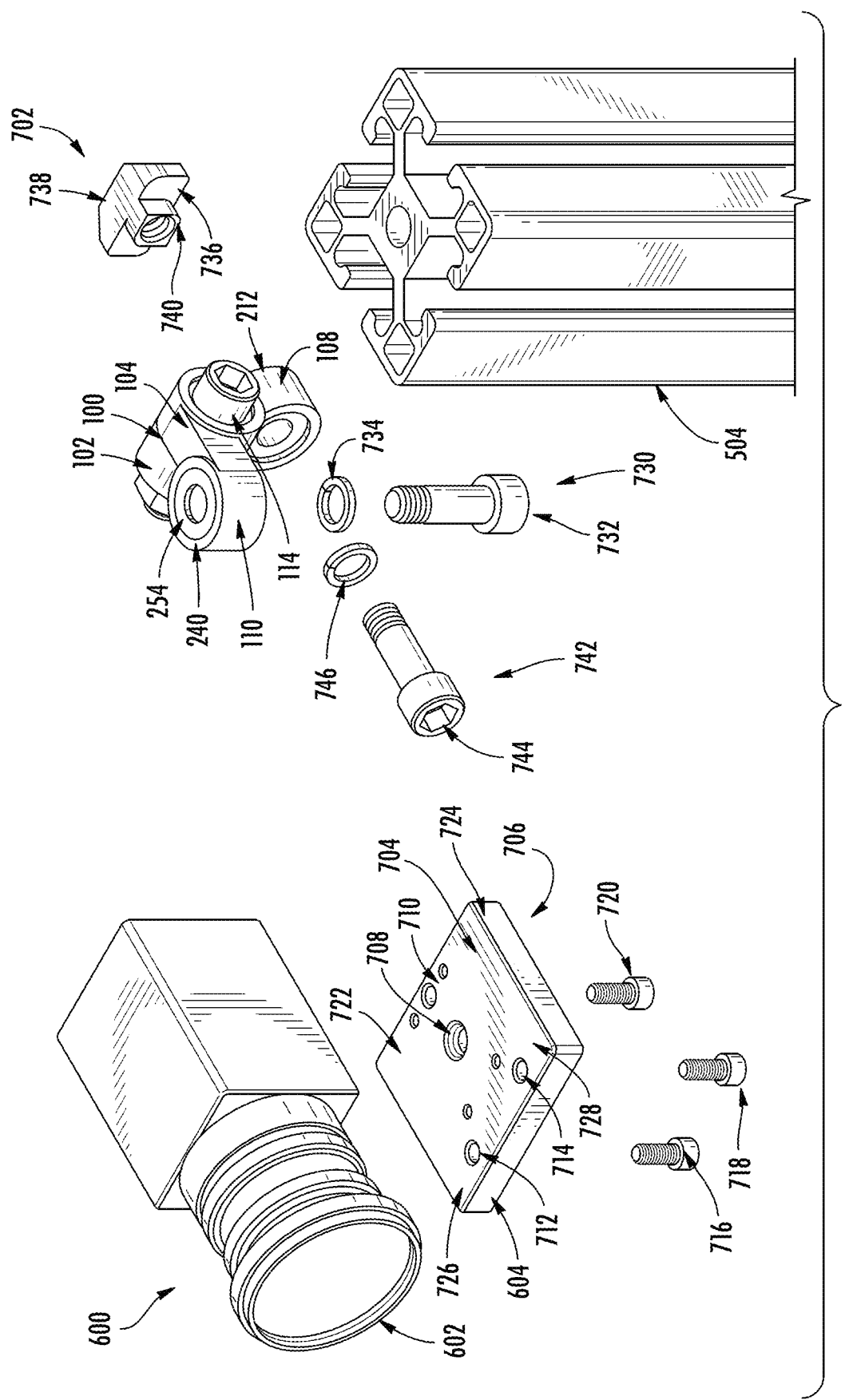
FIG. 7 exemplarily illustrates an exploded view of the object corresponding to the camera device coupled to the joint assembly, according to one or more embodiments described herein.

In an embodiment, the first recess 232, of the first peripheral surface 210 of the second peripheral section 214 of the second annular joint section 108 of the first joint component 102, receives a portion of a second screw 744 of the second fastener 742 that is engaged with a second washer 746 of the second fastener 742, as exemplarily illustrated and described in conjunction with FIG. 7. The second washer 746 is used to fasten the second screw 744.

In an embodiment, the second peripheral surface 212, of the second peripheral section 214 of the second annular joint section 108 of the first joint component 102, defines a second recess (not shown) defining the second axis 230. As described earlier, the second recess refers to a second depression defined in the second peripheral surface 212, of the second peripheral section 214 of the second annular joint section 108 of the first joint component 102, that defines the second axis 230 of the second annular joint section 108 of the first joint component 102. In an example embodiment, the second recess is inscribed in an inner peripheral surface of the second peripheral surface 212, of the second peripheral section 214 of the second annular joint section 108 of the first joint component 102, such that an outer peripheral surface of the second peripheral surface 212, of the second peripheral section 214 of the second annular joint section 108 of the first joint component 102, is elevated in comparison to the inner peripheral surface of the second peripheral surface 212 defining the second recess.

In an embodiment, the second recess, of the second peripheral surface 212 of the second peripheral section 214 of the second annular joint section 108 of the first joint component 102, receives a second washer 234. As described earlier, the term "washer" refers to a washer made of elastic material that may deform when force is applied on the washer. For example, the second washer 234 is made of elastic material such as Teflon that may deform when force is applied on the second washer 234. In an example implementation, the material of the second washer 234 comprises any material with substantial elasticity to allow substantial friction between the second peripheral surface 212, of the second peripheral section 214 of the second annular joint section 108 of the first joint component 102, and the base component 504 (exemplarily illustrated in FIG. 5). For example, the material may be made of Polytetrafluoroethylene (PTFE) material such as Teflon.

In an embodiment, the second peripheral surface 212, of the second peripheral section 214 of the second annular joint section 108 of the first joint component 102, abuts with the base component 504 via the second washer 234, as exemplarily illustrated and described in conjunction with FIG. 7. In an embodiment, a mounting section 506 of the base component 504 may comprise a base recess (not shown) that receives a supplementary base washer (not shown) which may be identical to the second washer 234, that is received in the second recess of the second peripheral surface 212 of the second peripheral section 214 of the second annular joint section 108 of the first joint component 102. In this embodiment, the second peripheral surface 212, of the second peripheral section 214 of the second annular joint section 108 of the first joint component 102, abuts with the mounting section 506 of the base component 504, via the second washer 234 and the supplementary base washer, respectively.

In another embodiment, the scope of the disclosure is not limited to the second peripheral surface 212, of the second peripheral section 214 of the second annular joint section 108 of the first joint component 102, abutting with the base component 504 but may comprise the second peripheral surface 212, of the second peripheral section 214 of the second annular joint section 108 of the first joint component 102, attached to a wall via the second washer 234, without departing from the scope of the disclosure. In this embodiment, the joint assembly 100 is attached to the wall to allow mounting of the object 502 (exemplarily illustrated in FIG. 5) to the wall, thereby eliminating the need of the base component 504.

In an embodiment, the second annular joint section 108 of the first joint component 102 is fixedly coupled to the first annular joint section 106 of the first joint component 102, as exemplarily illustrated in FIG. 2. In another embodiment, the second annular joint section 108 of the first joint component 102 is not limited to be fixedly coupled to the first annular joint section 106 of the first joint component 102 but may be coupled to the first annular joint section 106 of the first joint component 102 via a first adjoining section 236. In this embodiment, the first joint component 102 may comprise the first adjoining section 236. In an embodiment, the first adjoining section 236 is fixedly coupled to the first annular joint section 106 of the first joint component 102 and the second annular joint section 108 of the first joint component 102 at opposing ends of the first adjoining section 236.

In an embodiment, the first adjoining section 236 may be defined of a first predetermined length. In an example embodiment, the length of the first adjoining section 236 is predetermined based on an application of the joint assembly 100. Consider an example, where a camera device 602 (exemplarily illustrated in FIG. 6) is configured to rotate above the mounting section 506 of the base component 504 (exemplarily illustrated in FIG. 6), that may correspond to a top surface of a tripod stand with a mounting frame. In this example, when the camera device 602 is configured to rotate above the mounting section 506 of the base component 504 to about 360 degrees along a third axis 238 ("yaw" axis), the length of the first adjoining section 236 is predetermined to be rotatable above a top surface 508 of the base component 504. In an example implementation, if the base component 504 is a tripod stand (not shown) and the camera device 602 is configured to rotate about the third axis 238 (the yaw axis), the length of the first adjoining section 236 is predetermined to be long enough to be rotatable above a top surface of the tripod stand. In some examples, the scope of the disclosure is not limited to the first adjoining section 236 having a rectangular shape, as exemplarily illustrated in FIG. 2. In an example embodiment, the shape of the first adjoining section 236 may correspond to other polygons, without departing from the scope of the disclosure.

In an embodiment, the second joint component 104 comprises a first annular joint section 110 and a second annular joint section 112, as exemplarily illustrated in FIG. 2. As described earlier, the phrases "first annular joint section" and "second annular joint section" refer to annular sections of the second joint component 104 such that each annular section defines a respective through hole to allow passage and retention of a fastener such as, a screw component in the respective through hole. For example, the first annular joint section 110 of the second joint component 104 defines a first through hole 246 to allow retention of a portion of the third fastener 730 (exemplarily illustrated in FIG. 7), which will be described further in the description below. In another example, the second annular joint section 112 of the second joint component 104 defines a second through hole 250 to allow retention of a portion of the first fastener 114, which will be described further in the description below.

In an embodiment, the first annular joint section 110 of the second joint component 104 defines the third axis 238. In an example embodiment, the third axis 238 may correspond to an axis that may pass through the first through hole 246 of the first annular joint section 110 of the second joint component 104. In an embodiment, the third axis 238 is one of the three axes of the joint assembly 100 that provide three DOF to a rotational motion of the object 502 (exemplarily illustrated in FIG. 5) with respect to the base component 504 (exemplarily illustrated in FIG. 5). For example, the third axis 238 corresponds to a Z-axis that allows "yaw" rotational motion of the object 502 such as the camera device 602 with respect to the base component 504, as exemplarily illustrated and described further in conjunction with FIG. 8.

In an embodiment, the first annular joint section 110 of the second joint component 104 defines a first peripheral section 244, as exemplarily illustrated in FIG. 2. As described earlier, the phrase "first peripheral section" refers to a tubular section defined about the third axis 238 defined by the first annular joint section 110 of the second joint component 104, as exemplarily illustrated in FIG. 2. In an embodiment, the first peripheral section 244 of the first annular joint section 110 of the second joint component 104 is defined to rotate about the third axis 238. For example, the rotation of the first peripheral section 244 of the first annular joint section 110 of the second joint component 104 about the third axis 238 allows the "yaw" rotational motion of the object 502 such as the camera device 602 with respect to the base component 504, as exemplarily illustrated and described further in conjunction with FIG. 8. For example, the first annular joint section 110 of the second joint component 104 is rotatable about the third axis 238 corresponding to the Z-axis, thereby allowing the object 502 coupled to the joint assembly 100 to rotate in left or right directions (yaw) about the third axis 238. In an embodiment, the third axis 238 is orthogonal to the first axis 218 and the second axis 230, as exemplarily illustrated in FIG. 2 and FIG. 8.

In an embodiment, the first peripheral section 244 of the first annular joint section 110 of the second joint component 104 comprises a first peripheral surface 240 and a second peripheral surface. As described earlier, the phrases "first peripheral surface" and "second peripheral surface" refer to planar surfaces of the first peripheral section 244 of the first annular joint section 110 of the second joint component 104 that are spaced apart along the third axis 238 defined by the first peripheral section 244 of the first annular joint section 110 of the second joint component 104.

In an embodiment, the first peripheral surface 240 and the second peripheral surface 242, of the first peripheral section 244 of the first annular joint section 110 of the second joint component 104, define the first through hole 246 to allow retention of a portion of the third fastener 730 (exemplarily illustrated in FIG. 7). The first through hole 246 extends from first peripheral surface 240 to the second peripheral surface 242 of the first peripheral section 244 of the first annular joint section 110 of the second joint component 104. In another example, the first peripheral surface 248 and the second peripheral surface 224, of the second peripheral section 226 of the second annular joint section 112 of the second joint component 104, define the second through hole 250 to allow retention of a portion of the first fastener 114, as exemplarily illustrated in FIG. 2. The second through hole 250 extends from the first peripheral surface 248 to the second peripheral surface 224, of the second peripheral section 226 of the second annular joint section 112 of the second joint component 104.

In an embodiment, the first peripheral surface 240, of the first peripheral section 244 of the first annular joint section 110 of the second joint component 104, defines a first recess 252 defining the third axis 238. As described earlier, the term "first recess" refers to a depression defined in the first peripheral surface 240, of the first peripheral section 244 of the first annular joint section 110 of the second joint component 104, that defines the third axis 238 of the first annular joint section 110 of the second joint component 104. In an example embodiment, the first recess 252 is inscribed in an inner peripheral surface of the first peripheral surface 240, of the first peripheral section 244 of the first annular joint section 110 of the second joint component 104, such that an outer peripheral surface of the first peripheral surface 240, of the first peripheral section 244 of the first annular joint section 110 of the second joint component 104, is elevated in comparison to the inner peripheral surface of the first peripheral surface 240 defining the first recess 252, as exemplarily illustrated in FIG. 2.

In an embodiment, the first recess 252, of the first peripheral surface 240 of the first peripheral section 244 of the first annular joint section 110 of the second joint component 104, receives a third washer 254. As used herein, the term "third washer" refers to a washer made of elastic material that may deform when force is applied on the third washer 254. For example, the third washer 254 is made of elastic material such as Teflon that may deform when force is applied on the third washer 254. In an example implementation, the material of the third washer 254 comprises any material with substantial elasticity to allow substantial friction between the first peripheral surface 240, of the first peripheral section 244 of the first annular joint section 110 of the second joint component 104, and the object 502 (exemplarily illustrated in FIG. 5). For example, the material may be made of Polytetrafluoroethylene (PTFE) material such as Teflon.

In an embodiment, the first peripheral surface 240, of the first peripheral section 244 of the first annular joint section 110 of the second joint component 104, abuts with the object 502 (exemplarily illustrated in FIG. 5) via the third washer 254. In an example embodiment, the first peripheral surface 240, of the first peripheral section 244 of the first annular joint section 110 of the second joint component 104, abuts with a second surface 706 of a first attachment member 604 (exemplarily illustrated in FIG. 7) to attach to the object 502, via the third washer 254, as exemplarily illustrated and described in conjunction with FIG. 7. In this embodiment, the second surface 706 of the first attachment member 604 may comprise a recess (not shown) that receives a supplementary attachment washer (not shown). The supplementary washer may be identical to the third washer 254, that is received in the first recess 252 of the first peripheral surface 240 of the first peripheral section 244 of the first annular joint section 110 of the second joint component 104. In this embodiment, the first peripheral surface 240, of the first peripheral section 244 of the first annular joint section 110 of the second joint component 104, abuts with the second surface 706 of the first attachment member 604 to attach to the object 502, via the third washer 254 and the supplementary attachment washer (not shown), respectively.

In an embodiment, the second peripheral surface 242, of the first peripheral section 244 of the first annular joint section 110 of the second joint component 104, defines a second recess (not shown) defining the third axis 238. As described earlier, the second recess refers to a second depression defined in the second peripheral surface 242, of the first peripheral section 244 of the first annular joint section 110 of the second joint component 104, that defines the third axis 238 of the first annular joint section 110 of the second joint component 104. In an example embodiment, the second recess is inscribed in an inner peripheral surface of the second peripheral surface 242, of the first peripheral section 244 of the first annular joint section 110 of the second joint component 104, such that an outer peripheral surface of the second peripheral surface 242, of the first peripheral section 244 of the first annular joint section 110 of the second joint component 104, is elevated in comparison to the inner peripheral surface of the second peripheral surface 242 defining the second recess. In an example embodiment, the second recess, of the second peripheral surface 242 of the first peripheral section 244 of the first annular joint section 110 of the second joint component 104, receives a portion of the third screw 732 of the third fastener 730 that is engaged with a third washer 734 of the third fastener 730, as exemplarily illustrated and described in conjunction with FIG. 7.

In an embodiment, the second annular joint section 112 of the second joint component 104 comprises a second peripheral section 226, as exemplarily illustrated in FIG. 2. As described earlier, the phrase "second peripheral section" refers to a tubular section defined about the first axis 218 defined by the second annular joint section 112 of the second joint component 104. In an embodiment, the second peripheral section 226 of the second annular joint section 112 of the second joint component 104 is defined to rotate about the first axis 218. For example, the rotation of the second peripheral section 226 of the second annular joint section 112 of the second joint component 104 about the first axis 218 allows the "pitch" rotational motion of the camera device 602 with respect to the base component 504, as exemplarily illustrated and described further in conjunction with FIG. 8. In an embodiment, the second peripheral section 226 of the second annular joint section 112 of the second joint component 104 is defined to rotate about the first axis 218.

In an embodiment, the second peripheral section 226 of the second annular joint section 112 of the second joint component 104 comprises a first peripheral surface 248 and a second peripheral surface 224. As described earlier, the phrases "first peripheral surface" and "second peripheral surface" refer to planar surfaces of the second peripheral section 226 of the second annular joint section 112 of the second joint component 104 that are spaced apart along the first axis 218 defined by the second peripheral section 226 of the second annular joint section 112 of the second joint component 104.

In an embodiment, the first peripheral surface 248, of the second peripheral section 226 of the second annular joint section 112 of the second joint component 104, defines a first recess 256 defining the first axis 218. In an example embodiment, the first recess 256 refers to a first depression defined in the first peripheral surface 248, of the second peripheral section 226 of the second annular joint section 112 of the second joint component 104, that defines the first axis 218 of the second annular joint section 112 of the second joint component 104. In an example embodiment, the first recess 256 is inscribed in an inner peripheral surface of the first peripheral surface 248, of the second peripheral section 226 of the second annular joint section 112 of the second joint component 104, such that an outer peripheral surface of the first peripheral surface 248, of the second peripheral section 226 of the second annular joint section 112 of the second joint component 104, is elevated in comparison to the inner peripheral surface of the first peripheral surface 248 defining the first recess 256, as exemplarily illustrated in FIG. 2. In an embodiment, the first recess 256, of the first peripheral surface 248 of the second peripheral section 226 of the second annular joint section 112 of the second joint component 104, receives a portion of the first screw 116 of the first fastener 114 that is engaged with the first nut 118 and the first washer 228 of the first fastener 114, as exemplarily illustrated in FIG. 2. The first nut 118 and the first washer 228 are used to fasten the first screw 116.

In an embodiment, the second peripheral surface 224, of the second peripheral section 226 of the second annular joint section 112 of the second joint component 104, defines a second recess (not shown) defining the first axis 218. As described earlier, the second recess refers to a second depression defined in the second peripheral surface 224, of the second peripheral section 226 of the second annular joint section 112 of the second joint component 104, that defines the first axis 218 of the second annular joint section 112 of the second joint component 104. In an example embodiment, the second recess is inscribed in an inner peripheral surface of the second peripheral surface 224, of the second peripheral section 226 of the second annular joint section 112 of the second joint component 104, such that an outer peripheral surface of the second peripheral surface 224, of the second peripheral section 226 of the second annular joint section 112 of the second joint component 104, is elevated in comparison to the inner peripheral surface of the second peripheral surface 224 defining the second recess.

In an embodiment, the second recess of the second peripheral surface 224, of the second peripheral section 226 of the second annular joint section 112 of the second joint component 104, receives the first washer 222. In an example implementation, the first washer 222 comprises Teflon material with substantial elasticity to allow substantial friction between the first peripheral surface 202, of the first peripheral section 206 of the first annular joint section 106 of the first joint component 102, and the second peripheral surface 224, of the second peripheral section 226 of the second annular joint section 112 of the second joint component 104.

In an embodiment, the second joint component 104 is coupled to the first joint component 102. In this embodiment, the first peripheral surface 202, of the first peripheral section 206 of the first annular joint section 106 of the first joint component 102, abuts with the second peripheral surface 224, of the second peripheral section 226 of the second annular joint section 112 of the second joint component 104, via the first washer 222.

In an embodiment, the second recess (not shown), of the second peripheral surface 224 of the second peripheral section 226 of the second annular joint section 112 of the second joint component 104, is not limited to receiving the first washer 222. In another embodiment, the second recess, of the second peripheral surface 224 of the second peripheral section 226 of the second annular joint section 112 of the second joint component 104, may receive a supplementary first washer (not shown) which is identical to the first washer 222 that is received in the first recess 220 defined in the first peripheral surface 202 of the first peripheral section 206 of the first annular joint section 106 of the first joint component 102. In this embodiment, the first peripheral surface 202, of the first peripheral section 206 of the first annular joint section 106 of the first joint component 102, abuts with the second peripheral surface 224, of the second peripheral section 226 of the second annular joint section 112 of the second joint component 104, via the first washer 222 and the supplementary first washer, respectively.

In an embodiment (not shown), the second annular joint section 112 of the second joint component 104 is fixedly coupled to the first annular joint section 110 of the second joint component 104. In another embodiment, the second annular joint section 112 of the second joint component 104 is not limited to be fixedly coupled to the first annular joint section 110 of the second joint component 104 but may be coupled to the first annular joint section 110 of the second joint component 104 via a second adjoining section 258. In this embodiment, the second joint component 104 may further comprise the second adjoining section 258, exemplarily illustrated in FIG. 2. In an embodiment, the second adjoining section 258 is fixedly coupled to the first annular joint section 110 of the second joint component 104 and the second annular joint section 112 of the second joint component 104 at opposing ends 260 and 262 of the second adjoining section 258.

In an embodiment, the second adjoining section 258 may be defined of a second predetermined length. In an example embodiment, the length of the second adjoining section 258 is predetermined based on an application of the joint assembly 100. For example, when the object 502 (exemplarily illustrated in FIG. 5) is configured to rotate about the first axis 218, for example, to about 180 degrees along the first axis 218 ("pitch" axis), the length of the second adjoining section 258 is predetermined to be rotatable about 180 degrees along the first axis 218 ("pitch" axis). The rotation of the object 502 to a full 360 degrees is limited by the base component 504 coupled to the object 502 and the joint assembly 100. In an example implementation, if the base component 504 is a tripod stand (not shown) and the object 502 is the camera device 602 that is configured to rotate about the first axis 218 (the pitch axis), the length of the second adjoining section 258 is predetermined to be long enough to be rotatable above a top surface of the tripod stand. In some examples, the scope of the disclosure is not limited to the second adjoining section 258 having a rectangular shape, as exemplarily illustrated in FIG. 2. In an example embodiment, the shape of the second adjoining section 258 may correspond to other polygons, without departing from the scope of the disclosure.

Figure 3:
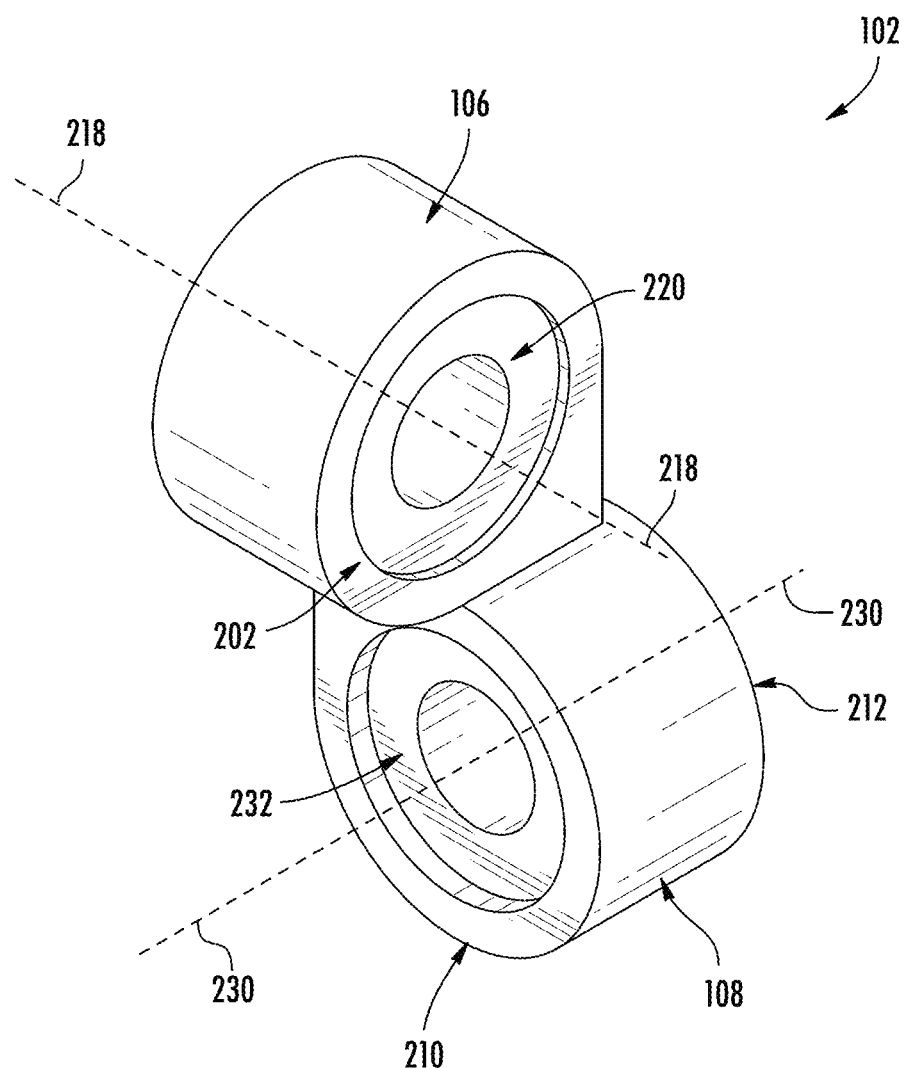
FIG. 3 exemplarily illustrates a perspective view of a joint component, according to one or more embodiments described herein.

FIG. 3 exemplarily illustrates a perspective view of a joint component 102 or 104, according to one or more embodiments described herein. In an example embodiment, the joint component exemplarily illustrated in FIG. 3 may correspond to the first joint component 102 or the second joint component 104 that are coupled together to form the joint assembly 100, as described in conjunction with FIG. 2. With reference to FIG. 3, the illustrated joint component corresponds to the first joint component 102. The structure of the first joint component 102 is described in detail in conjunction with FIG. 2. In an embodiment, the first joint component 102 comprises the first annular joint section 106 and the second annular joint section 108. As exemplarily illustrated in FIG. 3, the second annular joint section 108 of the first joint component 102 is fixedly coupled to the first annular joint section 106 of the first joint component 102. The first annular joint section 106 of the first joint component 102 defines the first axis 218. The first annular joint section 106 of the first joint component 102 defines the first peripheral section 206. The first peripheral section 206 of the first annular joint section 106 of the first joint component 102 is defined to rotate about the first axis 218.

The second annular joint section 108 of the first joint component 102 defines the second axis 230. The second annular joint section 108 of the first joint component 102 defines the second peripheral section 214. The second peripheral section 214 of the second annular joint section 108 of the first joint component 102 is defined to rotate about the second axis 230. As exemplarily illustrated in FIG. 3, the second axis 230 is orthogonal to the first axis 218.

Figure 4A:
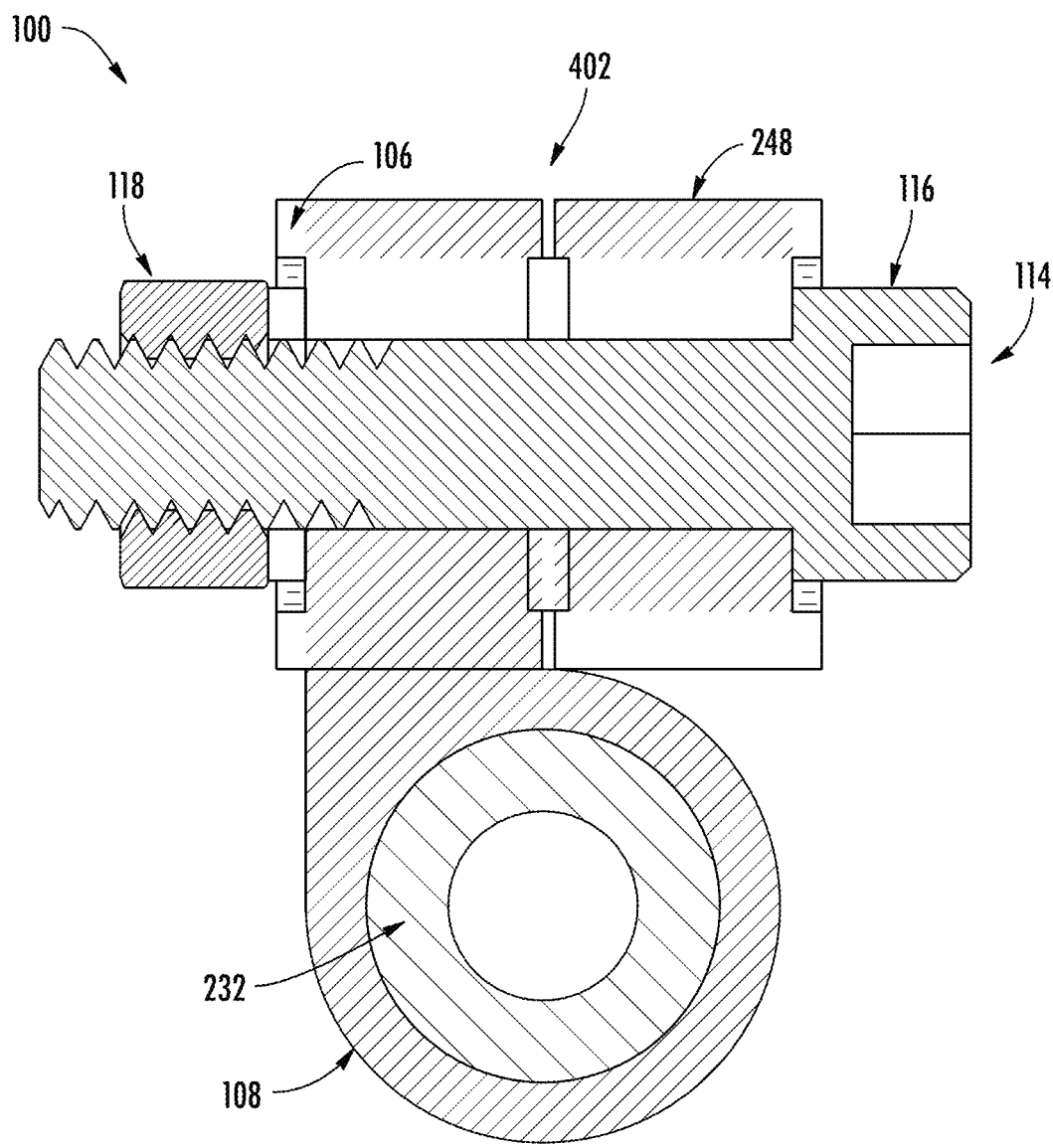
FIGS. 4A-4B exemplarily illustrate sectional views of the joint assembly showing two modes of operation of the joint assembly, according to one or more embodiments described herein.
Figure 4B:
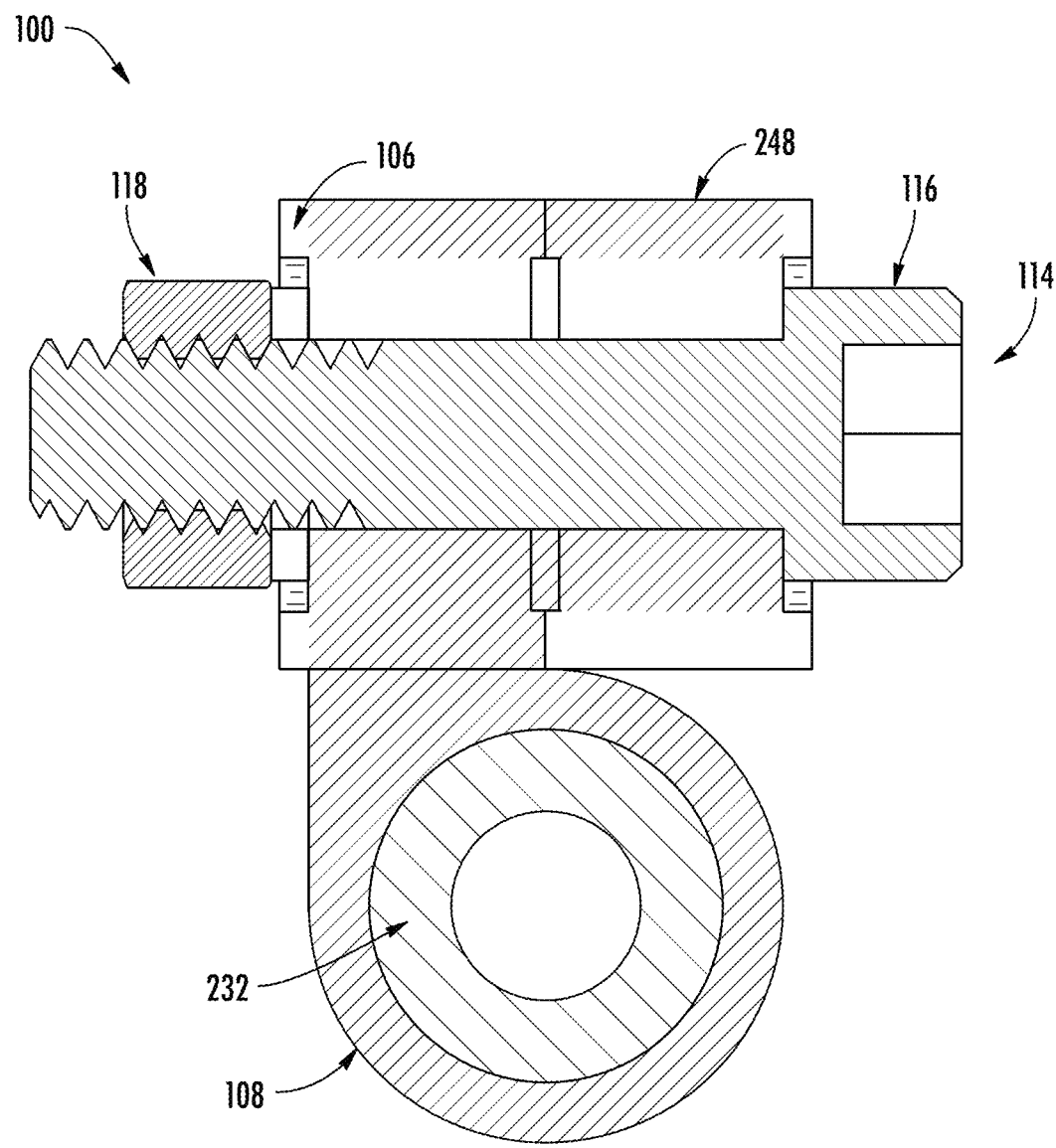

FIGS. 4A-4B exemplarily illustrate sectional views of the joint assembly 100 showing two modes of operation of the joint assembly 100, according to one or more embodiments described herein. FIG. 4A exemplarily illustrates a sectional view of the joint assembly 100 showing a first mode of operation of the joint assembly 100, according to one or more embodiments described herein. In an embodiment, the first peripheral surface 202, of the first peripheral section 206 of the first annular joint section 106 of the first joint component 102, couples with the second peripheral surface 224, of the second peripheral section 226 of the second annular joint section 112 of the second joint component 104, via the first washer 222 by using the first fastener 114. The first fastener 114 configures the joint assembly 100 to operate in at least two modes of operation.

In an embodiment, in the first mode of operation, the first peripheral surface 202, of the first peripheral section 206 of the first annular joint section 106 of the first joint component 102, and/or the second peripheral surface 224, of the second peripheral section 226 of the second annular joint section 112 of the second joint component 104, is defined to rotate about the first axis 218, via the first washer 222. In an example embodiment, the first fastener 114 is fastened to loosely couple the first peripheral surface 202, of the first peripheral section 206 of the first annular joint section 106 of the first joint component 102, with the second peripheral surface 224 of the second peripheral section 226 of the second annular joint section 112 of the second joint component 104. The first washer 222, received in the first recess 220 of the first peripheral surface 202, of the first peripheral section 206 of the first annular joint section 106 of the first joint component 102, creates a gap 402 between the first peripheral surface 202, of the first peripheral section 206 of the first annular joint section 106 of the first joint component 102, and the second peripheral surface 224 of the second peripheral section 226 of the second annular joint section 112 of the second joint component 104. The elasticity of the first washer 222 offers substantial friction to allow adjustment of an angle of orientation of the first peripheral surface 202, of the first peripheral section 206 of the first annular joint section 106 of the first joint component 102, with respect to the second peripheral surface 224 of the second peripheral section 226 of the second annular joint section 112 of the second joint component 104. For example, the angle of orientation of the first peripheral surface 202, of the first peripheral section 206 of the first annular joint section 106 of the first joint component 102, with respect to the second peripheral surface 224, of the second peripheral section 226 of the second annular joint section 112 of the second joint component 104, may be adjusted about the first axis 218 corresponding to the Y-axis. Hence, the adjustment of the angle of orientation facilitated by the elasticity of the first washer 222 allows changing/adjusting the "pitch" rotational motion of the object 502 (exemplarily illustrated in FIG. 5) with respect to the base component 504 (exemplarily illustrated in FIG. 5), about the first axis 218.

FIG. 4B exemplarily illustrates another sectional view of the joint assembly 100 showing a second mode of operation of the joint assembly 100, according to one or more embodiments described herein. When the position and/or the orientation of the object 502 (exemplarily illustrated in FIG. 5) is adjusted to a desirable position and/or orientation about the first axis 218, the first peripheral surface 202, of the first peripheral section 206 of the first annular joint section 106 of the first joint component 102, abuts with the second peripheral surface 224 of the second peripheral section 226 of the second annular joint section 112 of the second joint component 104. The first washer 222 is deformed to allow metal-to-metal contact of the first peripheral surface 202, of the first peripheral section 206 of the first annular joint section 106 of the first joint component 102, with the second peripheral surface 224 of the second peripheral section 226 of the second annular joint section 112 of the second joint component 104. In an embodiment, in the second mode of operation, the first nut 118 of the first fastener 114 is tightened to achieve the metal-to-metal contact between the first peripheral surface 202, of the first peripheral section 206 of the first annular joint section 106 of the first joint component 102, and the second peripheral surface 224 of the second peripheral section 226 of the second annular joint section 112 of the second joint component 104, thereby obliterating the gap 402. The metal-to-metal contact between the first joint component 102 and the second joint component 104 ensures a tight-fit of the object 502 that may be coupled to the second joint component 104 and the base component 504 that may be coupled to the first joint component 102.

In an embodiment (not shown), the second peripheral surface 212, of the second peripheral section 214 of the second annular joint section 108 of the first joint component 102, couples with the base component 504 via the second washer 234 by using the second fastener 742. The second fastener 742 configures the joint assembly 100 to operate in at least two modes of operation.

In an embodiment (not shown), in the first mode of operation, the second peripheral surface 212, of the second peripheral section 214 of the second annular joint section 108 of the first joint component 102, and/or the base component 504 is defined to rotate about the second axis 230, via the second washer 234. In an example embodiment, the second fastener 742 is fastened to loosely couple the second peripheral surface 212, of the second peripheral section 214 of the second annular joint section 108 of the first joint component 102, with the base component 504. The second washer 234 received in the second recess (not shown), of the second peripheral surface 212 of the second peripheral section 214 of the second annular joint section 108 of the first joint component 102, creates a gap (not shown) between the second peripheral surface 212, of the second peripheral section 214 of the second annular joint section 108 of the first joint component 102, and the base component 504. The elasticity of the second washer 234 offers substantial friction to allow adjustment of an angle of orientation of the second peripheral surface 212, of the second peripheral section 214 of the second annular joint section 108 of the first joint component 102, with respect to the base component 504. For example, the angle of orientation of the second peripheral surface 212, of the second peripheral section 214 of the second annular joint section 108 of the first joint component 102, with respect to the base component 504, may be adjusted about the second axis 230 corresponding to the X-axis. Hence, the adjustment of the angle of orientation facilitated by the elasticity of the second washer 234 allows changing/adjusting the "roll" rotational motion of the object 502 (exemplarily illustrated in FIG. 5) with respect to the base component 504, about the second axis 230.

When the position and/or the orientation of the object 502 is adjusted to a desirable position and/or orientation about the second axis 230, the second peripheral surface 212, of the second peripheral section 214 of the second annular joint section 108 of the first joint component 102, abuts with the base component 504. The second washer 234 is deformed to allow metal-to-metal contact of the second peripheral surface 212, of the second peripheral section 214 of the second annular joint section 108 of the first joint component 102, with the base component 504. In an embodiment, in the second mode of operation, a nut (not shown) of the second fastener 742 is tightened to achieve the metal-to-metal contact between the second peripheral surface 212, of the second peripheral section 214 of the second annular joint section 108 of the first joint component 102, and the base component 504, thereby obliterating the gap therebetween. The metal-to-metal contact between the second peripheral surface 212, of the second peripheral section 214 of the second annular joint section 108 of the first joint component 102, and the base component 504 ensures a tight-fit of the object 502 that may be coupled to the second joint component 104 and the base component 504 that may be coupled to the first joint component 102.

In an embodiment (not shown), the first peripheral surface 240, of the first peripheral section 244 of the first annular joint section 110 of the second joint component 104, couples with the object 502 via the third washer 254 by using the third fastener 730. The third fastener 730 configures the joint assembly 100 to operate in at least two modes of operation.

In an embodiment (not shown), in the first mode of operation, the first peripheral surface 240, of the first peripheral section 244 of the first annular joint section 110 of the second joint component 104, and/or the object 502 is defined to rotate about the third axis 238, via the third washer 254. In an example embodiment, the third fastener 730 is fastened to loosely couple the first peripheral surface 240, of the first peripheral section 244 of the first annular joint section 110 of the second joint component 104, with the object 502. The third washer 254 received in the first recess 252, of the first peripheral surface 240 of the first peripheral section 244 of the first annular joint section 110 of the second joint component 104, creates a gap (not shown) between the first peripheral surface 240, of the first peripheral section 244 of the first annular joint section 110 of the second joint component 104, and the object 502. The elasticity of the third washer 254 offers substantial friction to allow adjustment of an angle of orientation of the first peripheral surface 240, of the first peripheral section 244 of the first annular joint section 110 of the second joint component 104, with respect to the object 502. For example, the angle of orientation of the first peripheral surface 240, of the first peripheral section 244 of the first annular joint section 110 of the second joint component 104, with respect to the object 502, may be adjusted about the third axis 238 corresponding to the Z-axis. Hence, the adjustment of the angle of orientation facilitated by the elasticity of the third washer 254 allows changing/adjusting the "yaw" rotational motion of the object 502 with respect to the base component 504, about the third axis 238.

When the position and/or orientation of the object 502 is adjusted to a desirable position and/or orientation about the third axis 238, the first peripheral surface 240, of the first peripheral section 244 of the first annular joint section 110 of the second joint component 104, abuts with the object 502. The third washer 254 is deformed to allow metal-to-metal contact of the first peripheral surface 240, of the first peripheral section 244 of the first annular joint section 110 of the second joint component 104, with the object 502.

In an embodiment, in the second mode of operation, a nut (not shown) of the third fastener 730 is tightened to achieve the metal-to-metal contact between the first peripheral surface 240, of the first peripheral section 244 of the first annular joint section 110 of the second joint component 104, and the object 502, thereby obliterating the gap therebetween. The metal-to-metal contact between the first peripheral surface 240, of the first peripheral section 244 of the first annular joint section 110 of the second joint component 104, and the object 502 ensures a tight-fit of the object 502 that may be coupled to the second joint component 104 and the base component 504 that may be coupled to the first joint component 102.

Figure 5:
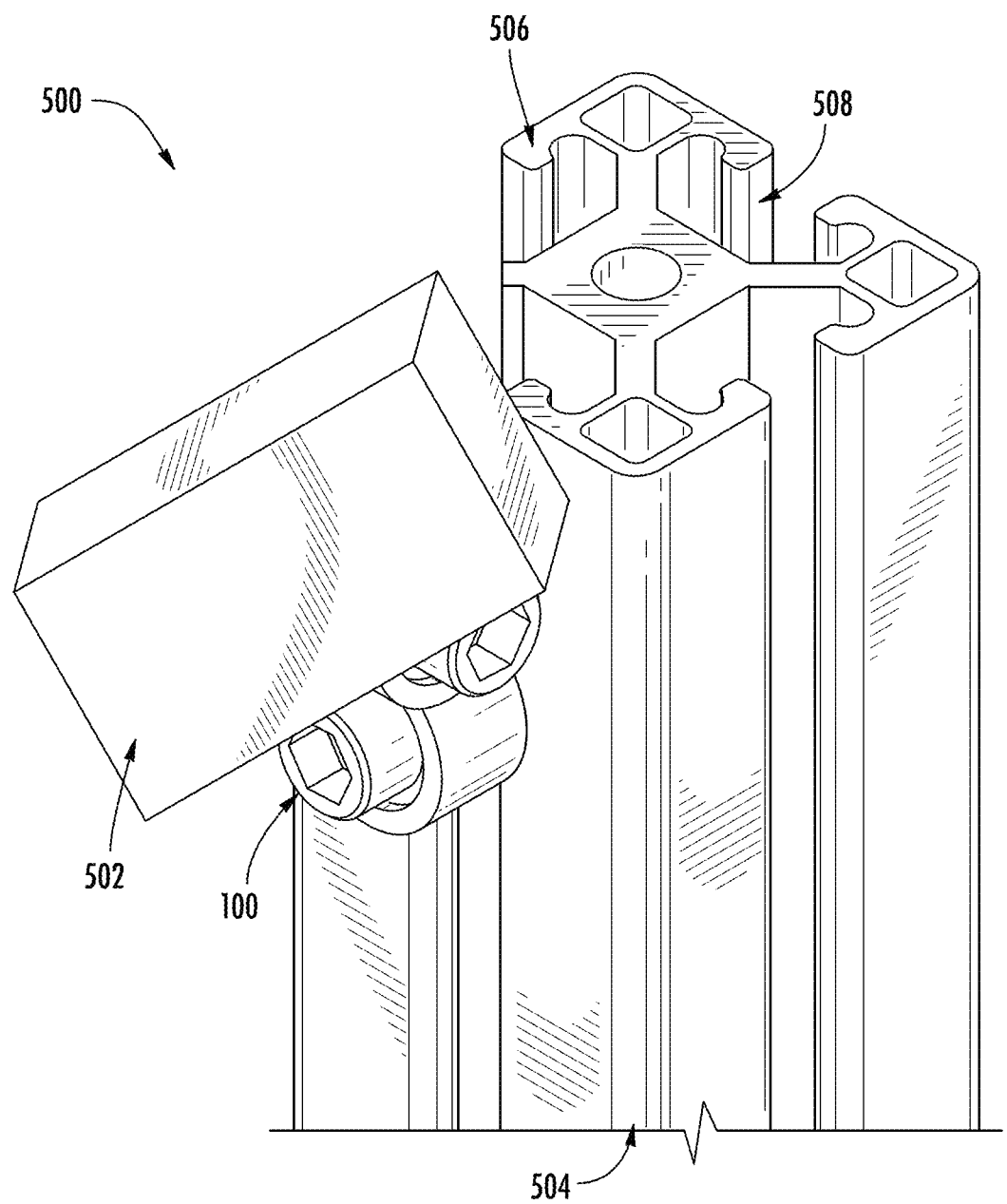
FIG. 5 exemplarily illustrates a perspective view of an object coupled to the joint assembly, according to one or more embodiments described herein.

FIG. 5 exemplarily illustrates a perspective view of the object 502 coupled to the joint assembly 100, according to one or more embodiments described herein. FIG. 5 exemplarily illustrates an apparatus 500 comprising the object 502 coupled to the base component 504 via the joint assembly 100. In an example embodiment, the object 502 may correspond to the camera device 602 (exemplarily illustrated and further described in conjunction with FIG. 6). In some examples, the scope of the disclosure is not limited to the object 502 corresponding to the camera device 602. In an example embodiment, the object 502 may correspond to any object 502 that requires mounting with three degrees of freedom (3DOF) capability in the rotational motion of the object 502, without departing from the scope of the disclosure. For example, the object 502 may correspond to any electronic device such as a mobile device, a portable computer, a mobile computer, a handheld computer, a scanning device, a smartphone, a tablet computer, an indicia reader (such as a barcode scanner), a television set, or any other object 502 that may require 3DOF capability in the rotational motion of the object 502. The 3DOF comprise yaw, pitch, and roll, as described further in conjunction with FIG. 8.

In an embodiment, the base component 504 may correspond to a structural assembly that provides support to the object 502. For example, the base component 504 may be a tripod stand or a wall mounted frame that is used to mount the object 502. The base component 504 may comprise a mounting section 506 (exemplarily illustrated in FIG. 5) and a base section (not shown). In an example embodiment, the mounting section 506 may correspond to a top surface 508 of the base component 504 such as a tripod stand with a mounting frame to support the object 502. However, the scope of the disclosure is not limited to mounting section 506 corresponding to the top surface 508 of the base component 504 but may correspond to any other surface of the base component 504 that may be configurable to mount the object 502, without departing from the scope of the disclosure. The mounting section 506 may be configured to receive the object 502 via the joint assembly 100. The base section may be configured to support the object 502 on the base component 504. In an embodiment, the scope of the disclosure is not limited to the usage of the base component 504 to mount the object 502 but may comprise the object 502 mounted directly to a wall, without departing from the scope of the disclosure. In this embodiment, the joint assembly 100 is coupled to the wall, as described in conjunction with FIG. 2. For the purpose of ongoing description, the object 502 is considered to be the camera device 602. However, those having ordinary skill in the art would appreciate that any object 502 can be coupled to the joint assembly 100, without departing from the scope of the disclosure.

Figure 6:
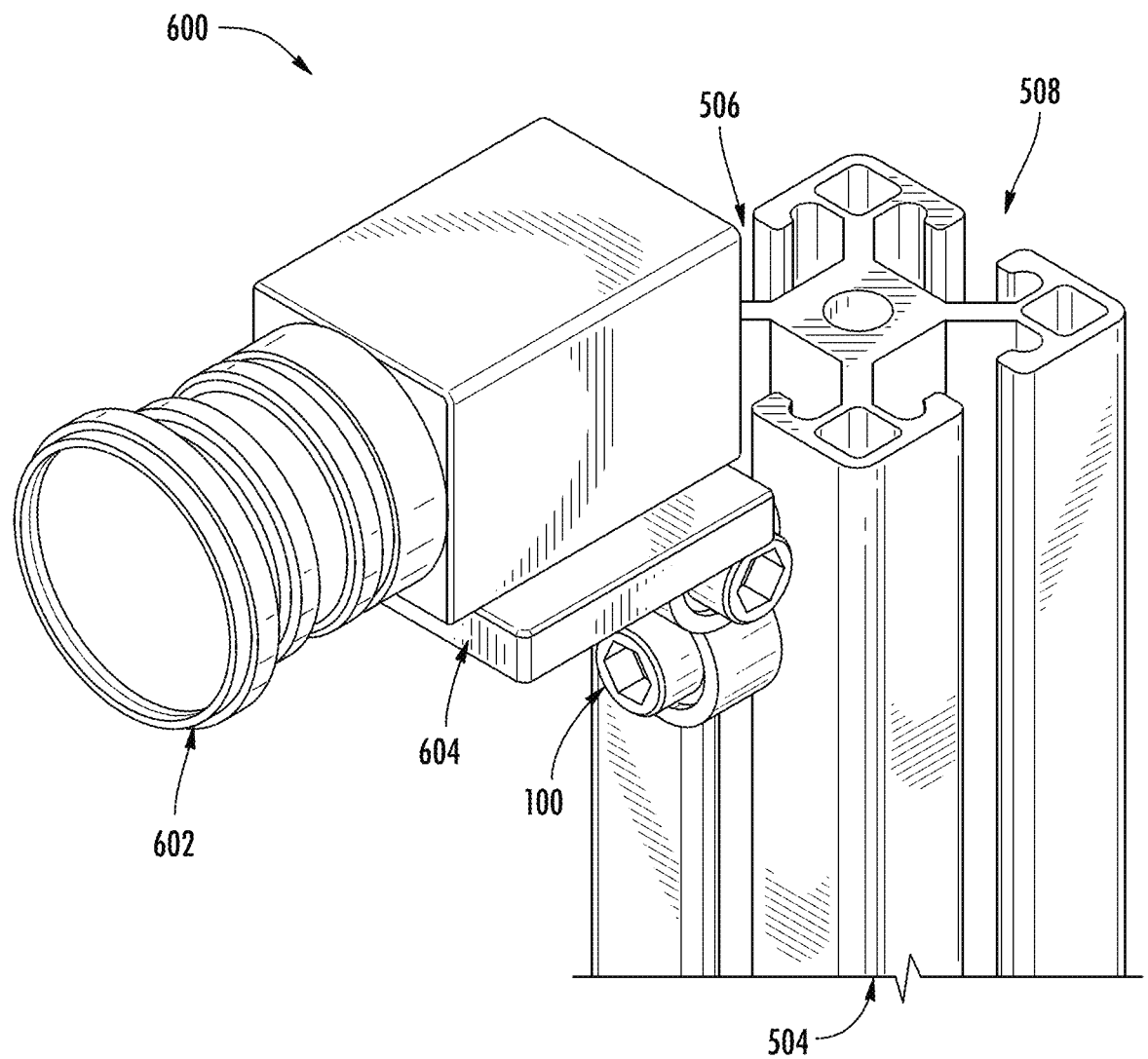
FIG. 6 exemplarily illustrates a perspective view of the object corresponding to a camera device coupled to the joint assembly, according to one or more embodiments described herein.

FIG. 6 exemplarily illustrates a perspective view of the object 502 corresponding to the camera device 602 coupled to the joint assembly 100, according to one or more embodiments described herein. FIG. 6 exemplarily illustrates an apparatus 600 comprising the camera device 602 coupled to the base component 504 via the joint assembly 100.

In an example embodiment, the object 502 may correspond to the camera device 602, as exemplarily illustrated in FIG. 6. In some examples, the scope of the disclosure is not limited to the object 502 corresponding to the camera device 602. In an example embodiment, the object 502 may correspond to any object 502 that requires mounting with 3DOF capability in the rotational motion of the object 502, as described in conjunction with FIG. 5. The 3DOF may comprise yaw, pitch, and roll, as described further in conjunction with FIG. 8. In an embodiment, the camera device 602 may correspond to any conventional camera such as, a digital camera, a camcorder, a professional video camera, a digital single-lens reflex camera (DSLR), a phone camera, a closed-circuit television (CCTV) camera, etc., that may be placed on the base component 504 such as, a stand or a wall mounted frame.

In an embodiment, the base component 504 may correspond to a structural assembly that provides support to the camera device 602. For example, the base component 504 may be a tripod stand or a wall mounted frame that is used to mount the camera device 602. In an example embodiment, the base component 504 may comprise the mounting section 506 and the base section (not shown). The mounting section 506 may be configured to receive the camera device 602 via the joint assembly 100. The base section may be configured to support the camera device 602 on the base component 504. In an embodiment, the scope of the disclosure is not limited to the usage of the base component 504 to mount the camera device 602 but may comprise the camera device 602 mounted directly to a wall, without departing from the scope of the disclosure. In this embodiment, the joint assembly 100 is coupled to the wall, as described in conjunction with FIG. 2.

In an embodiment, the joint assembly 100 is coupled to the camera device 602 and the base component 504. However, the scope of the disclosure is not limited to the joint assembly 100 being used to couple the camera device 602 to the base component 504 but may be used to couple any object 502 to the base component 504 (as described in conjunction with FIG. 5), without departing from the scope of the disclosure. In an embodiment, the joint assembly 100 is configured to provide the 3DOF to the rotational motion of the camera device 602 with respect to the base component 504, as is described in conjunction with FIG. 8.

In an embodiment, the joint assembly 100 further comprises a first attachment member 604. In an example embodiment, the first attachment member 604 may be a rectangular shaped adapter that is used to couple the joint assembly 100 to the camera device 602, as exemplarily illustrated in FIG. 6 and FIG. 7 and described further in conjunction with FIG. 7. In some examples, the scope of the disclosure is not limited to the first attachment member 604 having a rectangular shape, as exemplarily illustrated in FIG. 7. In an example embodiment, the shape of the first attachment member 604 may correspond to other polygons, without departing from the scope of the disclosure.

FIG. 7 exemplarily illustrates an exploded view of the object 502 corresponding to the camera device 602 coupled to the joint assembly 100, according to one or more embodiments described herein. In an embodiment, the joint assembly 100 comprises the first joint component 102 and the second joint component 104. In an example embodiment, the first joint component 102 and the second joint component 104 may be made of cast aluminum alloy or other similar metals for mechanical strength and stability in camera mounting assemblies. As exemplarily illustrated in FIG. 7, the first joint component 102 comprises the second annular joint section 108 and the second joint component 104 comprises the first annular joint section 110. The structures of the joint assembly 100 comprising the first joint component 102 and the second joint component 104 are described in conjunction with FIGS. 1 and 2.

In an embodiment, the joint assembly 100 further comprises the first attachment member 604 and a second attachment member 702. In an example embodiment, the first attachment member 604 has a rectangular shape. In some examples, the scope of the disclosure is not limited to the first attachment member 604 having a rectangular shape, as exemplarily illustrated in FIG. 7. In an example embodiment, the shape of the first attachment member 604 may correspond to other polygons, without departing from the scope of the disclosure. Although structure of the first attachment member 604 is described herein in detail, they are used in a generic and descriptive sense only and not for the purposes of limitation.

In an embodiment, the first attachment member 604 comprises a first surface 704 and a second surface 706. In an example embodiment, the first surface 704 corresponds to a top surface of the first attachment member 604 which receives the camera device 602 and the second surface 706 corresponds to a bottom surface of the first attachment member 604 which receives the joint assembly 100.

In an embodiment, the first attachment member 604 corresponds to a rectangular adapter. In an example embodiment, the first surface 704 and the second surface 706 of the first attachment member 604 define a plurality of through holes 708, 710, 712, and 714 that extend from the second surface 706 to the first surface 704, as exemplarily illustrated in FIG. 7. In an example embodiment, the through holes 710, 712, and 714 receive a set of fasteners 716, 718, and 720, respectively, to couple the first attachment member 604 to the camera device 602. In an example embodiment, the first surface 704 of the first attachment member 604 may be defined by four corners (a first corner 722, a second corner 724, a third corner 726, a fourth corner 728) of the first attachment member 604. The first corner 722 and the second corner 724 may define a first edge surface of the first attachment member 604 which is proximal to the base component 504. The third corner 726 and the fourth corner 728 may define a second edge surface of the first attachment member 604 which is distal from the base component 504. The first edge surface and the second edge surface are on opposing sides of the planar surface of the first attachment member 604. One through hole 710 may be defined at the first edge surface (substantially between the first corner 722 and the second corner 724) of the first attachment member 604. The other two through holes 712 and 714 may be defined at the second edge surface of the first attachment member 604 such that the through hole 712 is defined proximal to the third corner 726 and the through hole 714 is defined proximal to the fourth corner 728. In this embodiment, the set of fasteners 716, 718, and 720 comprise three screws, as exemplarily illustrated in FIG. 7. The set of fasteners 716, 718, and 720 may be passed through the set of through holes 710, 712, and 714 from the second surface 706 of the first attachment member 604. The set of fasteners 716, 718, and 720 are fastened to the camera device 602 to ensure a tight fit of the camera device 602 to the first attachment member 604. Although the structure of the first attachment member 604 is described herein in detail, they are used in a generic and descriptive sense only and not for the purposes of limitation.

In an example embodiment, the first attachment member 604 defines the through hole 708 at a central position on the planar surface of the first attachment member 604. In an example embodiment, the central position corresponds to a center of gravity of the first attachment member 604. In an example embodiment, a third fastener 730 may be passed through the through hole 708 via the second surface 706 of the first attachment member 604. In an example embodiment, the third fastener 730 corresponds to the third screw 732 and the third washer 734. The second surface 706 of the first attachment member 604 is attached to the first annular joint section 110 of the second joint component 104 of the joint assembly 100. The structure of the first annular joint section 110 of the second joint component 104 of the joint assembly 100 is described in conjunction with FIG. 1 and FIG. 2. The third screw 732 couples the first annular joint section 110 of the second joint component 104 of the joint assembly 100 to the second surface 706 of the first attachment member 604. The third fastener 730 is fastened to the camera device 602 to ensure a tight fit of the joint assembly 100 to the camera device 602 via the first attachment member 604. In some examples, the scope of the disclosure is not limited to the joint assembly 100 fastened to the camera device 602 via the first attachment member 604, as exemplarily illustrated in FIG. 7. In an example embodiment, the joint assembly 100 may be directly fastened to the camera device 602, thereby eliminating the need of the first attachment member 604. In this embodiment, the third fastener 730 is used to fasten the first annular joint section 110 of the second joint component 104 of the joint assembly 100 to the camera device 602.

In an embodiment, the joint assembly 100 further comprises a second attachment member 702. In an example embodiment, the second attachment member 702 corresponds to a T-slot nut. The second attachment member 702 comprises a first surface 736 and a second surface 738. In an example embodiment, the first surface 736 is proximal to the joint assembly 100 and the second surface 738 is proximal to the base component 504. The first surface 736 of the second attachment member 702 defines the shape of a T-slot nut. For example, the first surface 736 defines an elevated leg section and two flange sections extending from the elevated leg section, as exemplarily illustrated in FIG. 7. The elevated leg section may define a screw hole 740 extending from the first surface 736 to the second surface 738. The second surface 738 of the second attachment member 702 corresponding to the shape of a typical T-slot nut comprises semi-inclined flat surfaces at opposing ends of the second surface 738, such that two flange sections of the first surface 736 are backed by the semi-inclined flat surfaces of the second surface 738. The screw hole 740 of the second attachment member 702 receives a second fastener 742 to couple the joint assembly 100 to the base component 504. As exemplarily illustrated in FIG. 7, the second fastener 742 comprises a second screw 744 and a second washer 746 that are used to fasten the joint assembly 100 to the base component 504 in a tight-fit manner. In an embodiment, the first surface 736 of the second attachment member 702 is attached to a second peripheral surface 212 of the second annular joint section 108 of the first joint component 102, of the joint assembly 100 and the second surface 738 is attached to the base component 504. The structure of the second peripheral surface 212 of the second annular joint section 108 of the first joint component 102, of the joint assembly 100 is described in conjunction with FIG. 1 and FIG. 2. Hence, as described above, the joint assembly 100 couples the camera device 602 to the base component 504 in a tight-fit manner which avoids displacement of the camera device 602 from the base component 504 due to external factors such as, shock, vibrations, external force, etc., that may cause drifting of the camera device 602 from its desired position and orientation. In an embodiment, the fasteners 350, 352, and 354 of the joint assembly 100 may be tightened to avert the displacement of the camera device 602 due to the external factors. Although purpose of the joint assembly 100 is described to prevent the displacement of the camera device 602 due to the external factors, they are used in a descriptive sense only and not for the purposes of limitation.

Figure 8:
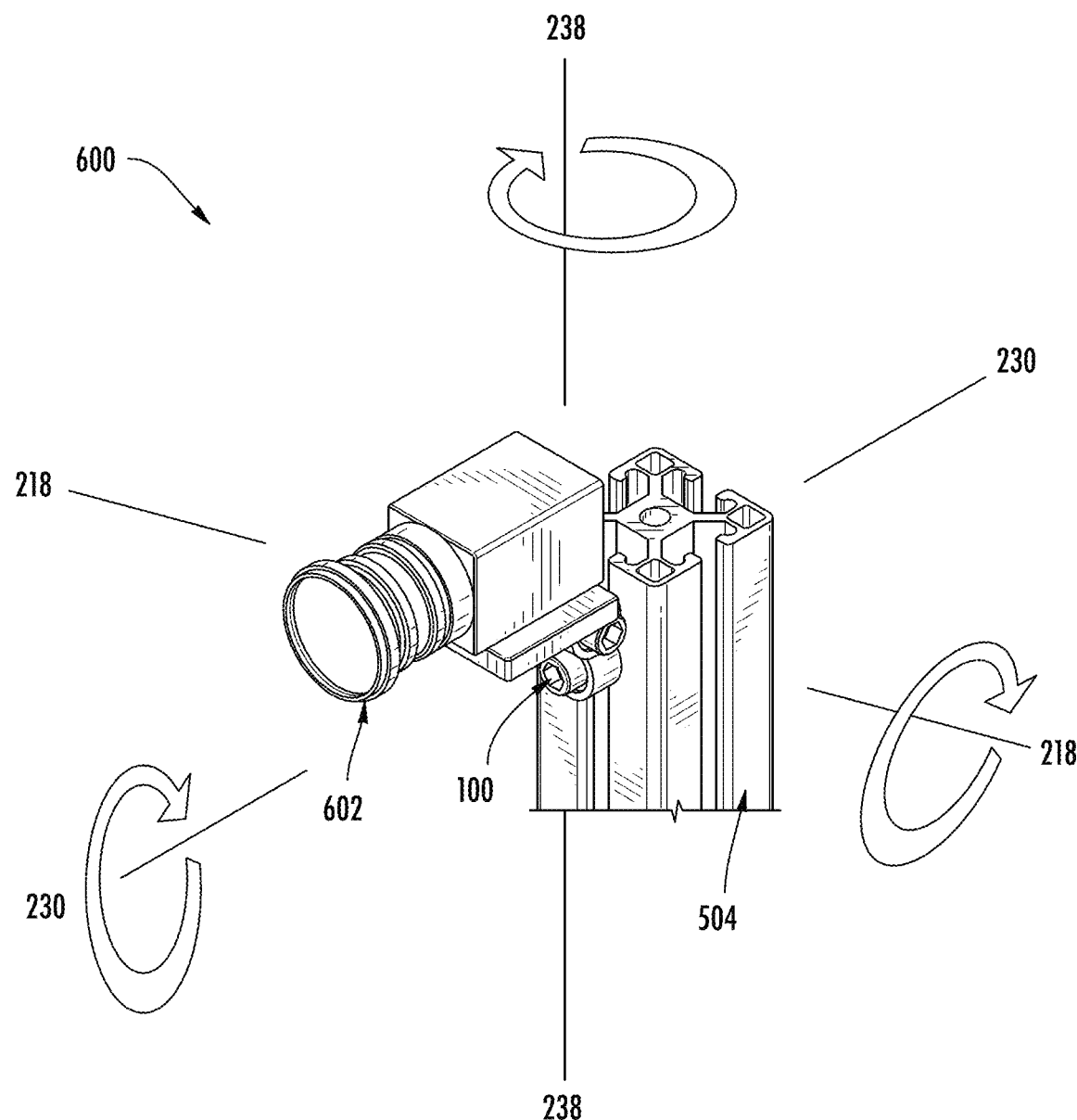
FIG. 8 exemplarily illustrates a perspective view of the object corresponding to the camera device coupled to the joint assembly providing three degrees of freedom to a rotational motion of the object, according to one or more embodiments described herein.

FIG. 8 exemplarily illustrates a perspective view of the joint assembly 100 providing three degrees of freedom to the rotational motion of the object 502 with respect to the base component 504, according to one or more embodiments described herein. For the purpose of ongoing description, the object 502 is considered to be the camera device 602. However, those having ordinary skill in the art would appreciate that any object 502 can be coupled to the joint assembly 100, without departing from the scope of the disclosure. In an example embodiment, the joint assembly 100 provides three degrees of freedom about the first axis 218, the second axis 230, and the third axis 238 to the rotational motion of the camera device 602 with respect to the base component 504.

In an embodiment, the first peripheral surface 202, of the first peripheral section 206 of the first annular joint section 106 of the first joint component 102, abuts with the second peripheral surface 224, of the second peripheral section 226 of the second annular joint section 112 of the second joint component 104, to be rotatable about the first axis 218, as described in conjunction with FIG. 2. In an example embodiment, the first axis 218 corresponds to the Y-axis that allows "pitch" rotational motion of the camera device 602, as exemplarily illustrated in FIG. 8.

In an embodiment, the second peripheral surface 212, of the second peripheral section 214 of the second annular joint section 108 of the first joint component 102, abuts with the base component 504 to be rotatable about the second axis 230, as described in conjunction with FIG. 2. In another embodiment, the scope of the disclosure is not limited to the second peripheral surface 212, of the second peripheral section 214 of the second annular joint section 108 of the first joint component 102, abutting with the base component 504 but may comprise the second peripheral surface 212, of the second peripheral section 214 of the second annular joint section 108 of the first joint component 102, attached to a wall via the second washer 234, without departing from the scope of the disclosure. In this embodiment, the joint assembly 100 is attached to the wall to allow mounting of the camera device 602 to the wall, thereby eliminating the need of the base component 504. In an example embodiment, the second axis 230 corresponds to the X-axis that allows "roll" rotational motion of the camera device 602, as exemplarily illustrated in FIG. 8.

In an embodiment, the first peripheral surface 240, of the first peripheral section 244 of the first annular joint section 110 of the second joint component 104, abuts with the camera device 602 to be rotatable about the third axis 238, as described in conjunction with FIG. 2. In an example embodiment, the third axis 238 corresponds to the Z-axis that allows "yaw" rotational motion of the camera device 602, as exemplarily illustrated in FIG. 8.

Therefore, the joint assembly 100 facilitates X, Y, and Z-axes rotational movements of the camera device 602, thereby allowing a user to efficiently adjust an orientation and/or a position of the camera device 602 about the first axis 218, the second axis 230, and/or the third axis 238 (i.e. X, Y, and Z-axes).

In the specification and figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing detailed description has set forth various embodiments of the devices and/or processes via the use of schematics, exemplary, and examples. Insofar as such schematics and examples contain one or more functions and/or operations, each function and/or operation within such schematics or examples can be implemented, individually and/or collectively, by a wide range of hardware thereof.

The various embodiments described above can be combined with one another to provide further embodiments. For example, two or more of example embodiments described above may be combined to, for example, improve the safety of laser printing and reduce the risks associated with laser-related accidents and injuries. These and other changes may be made to the present systems and methods in light of the above detailed description. Accordingly, the disclosure is not limited by the disclosure, but instead its scope is to be determined by the following claims.

The invention claimed is:

1. A joint component comprising:
   a first annular joint section defining a first axis, wherein a first peripheral section of the first annular joint section is defined to rotate about the first axis, and wherein each of a first peripheral surface and a second peripheral surface of the first annular joint section defines a respective recess defining the first axis; and
   a second annular joint section fixedly coupled to the first annular joint section, the second annular joint section defining a second axis, wherein a second peripheral section of the second annular joint section is defined to rotate about the second axis, wherein the second axis is orthogonal to the first axis, and wherein each of a first peripheral surface and a second peripheral surface of the second annular joint section defines a respective recess defining the second axis.

2. The joint component of claim 1, further comprising an adjoining section fixedly coupled to the first annular joint section and the second annular joint section at opposing ends of the adjoining section.

3. The joint component of claim 1, wherein the first peripheral surface of the first annular joint section abuts with another joint component.

4. A joint assembly comprising:
   a first joint component comprising:
      a first annular joint section defining a first axis, wherein a first peripheral section of the first annular joint section is defined to rotate about the first axis; and
      a second annular joint section fixedly coupled to the first annular joint section, the second annular joint section defining a second axis, wherein a second peripheral section of the second annular joint section is defined to rotate about the second axis, and wherein the second axis is orthogonal to the first axis; and
   a second joint component coupled to the first joint component, wherein the second joint component comprises:
      a first annular joint section defining a third axis, wherein a first peripheral section of the first annular joint section is defined to rotate about the third axis, and wherein the third axis is orthogonal to the first axis and the second axis; and
      a second annular joint section fixedly coupled to the first annular joint section, wherein a second peripheral section of the second annular joint section is defined to rotate about the first axis.

5. The joint assembly of claim 4, wherein the first joint component further comprises a first adjoining section fixedly coupled to the first annular joint section of the first joint component and the second annular joint section of the first joint component at opposing ends of the first adjoining section.

6. The joint assembly of claim 4, wherein the second joint component further comprises a second adjoining section fixedly coupled to the first annular joint section of the second joint component and the second annular joint section of the second joint component at opposing ends of the second adjoining section.

7. The joint assembly of claim 4, wherein:
a first peripheral surface of the first annular joint section of the first joint component defines a first recess defining the first axis, wherein the first recess receives a first washer,
the first peripheral surface of the first annular joint section of the first joint component couples with a second peripheral surface of the second annular joint section of the second joint component via the first washer by using a first fastener, wherein the first fastener configures the joint assembly to operate in at least two modes of operation comprising:
a first mode of operation in which at least one of the first peripheral surface of the first annular joint section of the first joint component and the second peripheral surface of the second annular joint section of the second joint component is defined to rotate about the first axis, via the first washer, and
a second mode of operation in which the first peripheral surface of the first annular joint section of the first joint component abuts with the second peripheral surface of the second annular joint section of the second joint component.

8. The joint assembly of claim 4, wherein:
a second peripheral surface of the second annular joint section of the first joint component defines a second recess defining the second axis, wherein the second recess receives a second washer,
the second peripheral surface of the second annular joint section of the second joint component couples with a base component via the second washer by using a second fastener, wherein the second fastener configures the joint assembly to operate in at least two modes of operation comprising:
a first mode of operation in which at least one of the second peripheral surface of the second annular joint section of the second joint component and the base component is defined to rotate about the second axis, via the second washer, and
a second mode of operation in which the second peripheral surface of the second annular joint section of the first joint component abuts with the base component.

9. The joint assembly of claim 4, wherein:
a first peripheral surface of the first annular joint section of the second joint component defines a first recess defining the third axis, wherein the first recess receives a third washer,
the first peripheral surface of the first annular joint section of the second joint component couples with an object via the third washer by using a third fastener, wherein the third fastener configures the joint assembly to operate in at least two modes of operation comprising:
a first mode of operation in which at least one of the first peripheral surface of the first annular joint section of the second joint component and the object is defined to rotate about the third axis, via the third washer, and
a second mode of operation in which the first peripheral surface of the first annular joint section of the second joint component abuts with the object.

10. The joint assembly of claim 4, further comprising:
a first attachment member comprising a first surface and a second surface, wherein the first surface is coupled to an object and the second surface is coupled to a first peripheral surface of the first annular joint section of the second joint component; and
a second attachment member comprising a first surface and a second surface, wherein the first surface is coupled to a second peripheral surface of the second annular joint section of the first joint component and the second surface is coupled to a base component.

11. An apparatus comprising:
an object;
a base component to provide support to the object; and
a joint assembly coupled to the object and the base component, wherein the joint assembly comprises:
a first joint component comprising:
a first annular joint section defining a first axis, wherein a first peripheral section of the first annular joint section is defined to rotate about the first axis; and
a second annular joint section fixedly coupled to the first annular joint section, the second annular joint section defining a second axis, wherein a second peripheral section of the second annular joint section is defined to rotate about the second axis, and wherein the second axis is orthogonal to the first axis; and
a second joint component coupled to the first joint component, wherein the second joint component comprises:
a first annular joint section defining a third axis, wherein a first peripheral section of the first annular joint section is defined to rotate about the third axis, and wherein the third axis is orthogonal to the first axis and the second axis; and
a second annular joint section fixedly coupled to the first annular joint section, wherein a second peripheral section of the second annular joint section is defined to rotate about the first axis.

12. The apparatus of claim 11, wherein the first joint component further comprises a first adjoining section fixedly coupled to the first annular joint section of the first joint component and the second annular joint section of the first joint component at opposing ends of the first adjoining section.

13. The apparatus of claim 11, wherein the second joint component further comprises a second adjoining section fixedly coupled to the first annular joint section of the second joint component and the second annular joint section of the second joint component at opposing ends of the second adjoining section.

14. The apparatus of claim 11, wherein:
a first peripheral surface of the first annular joint section of the first joint component defines a first recess defining the first axis, wherein the first recess receives a first washer,
the first peripheral surface of the first annular joint section of the first joint component couples with a second peripheral surface of the second annular joint section of the second joint component via the first washer by using a first fastener, wherein the first fastener configures the joint assembly to operate in at least two modes of operation comprising:

a first mode of operation in which at least one of the first peripheral surface of the first annular joint section of the first joint component and the second peripheral surface of the second annular joint section of the second joint component is defined to rotate about the first axis, via the first washer, and a second mode of operation in which the first peripheral surface of the first annular joint section of the first joint component abuts with the second peripheral surface of the second annular joint section of the second joint component.

15. The apparatus of claim 11, wherein:

a second peripheral surface of the second annular joint section of the first joint component defines a second recess defining the second axis, wherein the second recess receives a second washer, the second peripheral surface of the second annular joint section of the second joint component couples with the base component via the second washer by using a second fastener, wherein the second fastener configures the joint assembly to operate in at least two modes of operation comprising:

a first mode of operation in which at least one of the second peripheral surface of the second annular joint section of the second joint component and the base component is defined to rotate about the second axis, via the second washer, and a second mode of operation in which the second peripheral surface of the second annular joint section of the first joint component abuts with the base component.

16. The apparatus of claim 11, wherein:

a first peripheral surface of the first annular joint section of the second joint component defines a first recess defining the third axis, wherein the first recess receives a third washer, the first peripheral surface of the first annular joint section of the second joint component couples with the object via the third washer by using a third fastener, wherein the third fastener configures the joint assembly to operate in at least two modes of operation comprising:

a first mode of operation in which at least one of the first peripheral surface of the first annular joint section of the second joint component and the object is defined to rotate about the third axis, via the third washer, and a second mode of operation in which the first peripheral surface of the first annular joint section of the second joint component abuts with the object.

17. The apparatus of claim 11, further comprising a first attachment member comprising a first surface and a second surface, wherein the first surface is coupled to the object and the second surface is coupled to a first peripheral surface of the first annular joint section of the second joint component.

18. The apparatus of claim 11, further comprising a second attachment member comprising a first surface and a second surface, wherein the first surface is coupled to a second peripheral surface of the second annular joint section of the first joint component and the second surface is coupled to the base component.

19. The apparatus of claim 11, wherein the joint assembly provides three degrees of freedom to a rotational motion of the object with respect to the base component, wherein to provide the three degrees of freedom:

a first peripheral surface of the first annular joint section of the first joint component abut with a second peripheral surface of the second annular joint section of the second joint component is defined to rotate about the first axis;

the second peripheral surface of the second annular joint section of the first joint component abut with the base component is defined to rotate about the second axis; and the first peripheral surface of the first annular joint section of the second joint component abut with the object is defined to rotate about the third axis.

\* \* \* \* \*